United States Patent
Patel et al.

(10) Patent No.: US 11,449,366 B2
(45) Date of Patent: Sep. 20, 2022

(54) DEVOPS VIRTUAL ASSISTANT PLATFORM

(71) Applicant: Accenture Global Solutions Limited, Dublin (IE)

(72) Inventors: Parimal Patel, Bengaluru (IN); Prashant Mahale, Bengaluru (IN); Rajashree Chandrashekar, Bengaluru (IN)

(73) Assignee: Accenture Global Solutions Limited, Dublin (IE)

( * ) Notice: Subject to any disclaimer, the term of this patent is extended or adjusted under 35 U.S.C. 154(b) by 463 days.

(21) Appl. No.: 16/707,593

(22) Filed: Dec. 9, 2019

(65) Prior Publication Data

US 2021/0173718 A1 Jun. 10, 2021

(51) Int. Cl.

| | |
|---|---|
| *G06F 15/16* | (2006.01) |
| *G06F 9/50* | (2006.01) |
| *G06F 21/62* | (2013.01) |
| *G06F 9/22* | (2006.01) |
| *G06F 3/0484* | (2022.01) |
| *G06F 40/205* | (2020.01) |
| *G06F 40/30* | (2020.01) |
| *G06F 40/295* | (2020.01) |
| *G06F 8/60* | (2018.01) |

(52) U.S. Cl.
CPC .......... *G06F 9/5077* (2013.01); *G06F 3/0484* (2013.01); *G06F 8/60* (2013.01); *G06F 9/22* (2013.01); *G06F 21/629* (2013.01); *G06F 40/205* (2020.01); *G06F 40/295* (2020.01); *G06F 40/30* (2020.01)

(58) Field of Classification Search
CPC .... G06F 9/5077; G06F 40/205; G06F 40/295; G06F 40/30; G06F 3/0484; G06F 9/22

USPC .......... 709/220, 224, 226, 228, 232
See application file for complete search history.

(56) References Cited

U.S. PATENT DOCUMENTS

| | | | | |
|---|---|---|---|---|
| 10,042,636 | B1* | 8/2018 | Srivastava | G06N 20/00 |
| 10,754,506 | B1* | 8/2020 | Moyal | G06F 3/04842 |
| 10,967,098 | B2* | 4/2021 | Jabbari | A61L 27/3633 |
| 2020/0310888 | A1* | 10/2020 | Gopalan | G06F 21/31 |
| 2022/0091854 | A1* | 3/2022 | Chivukula | H04L 63/0272 |
| 2022/0091855 | A1* | 3/2022 | Chivukula | H04L 63/0272 |
| 2022/0091858 | A1* | 3/2022 | Chivukula | H04L 67/10 |
| 2022/0121479 | A1* | 4/2022 | Chivukula | G06F 9/223 |

FOREIGN PATENT DOCUMENTS

CA 2810652 A1 * 10/2013 ............ G06T 13/00

* cited by examiner

*Primary Examiner* — Khanh Q Dinh
(74) *Attorney, Agent, or Firm* — Harrity & Harrity, LLP

(57) ABSTRACT

A DevOps virtual assistant platform may analyze a DevOps workflow request received via a collaboration tool to identify one or more tasks, may activate and assign one or more worker bots to the one or more tasks, may verify, based on user credentials of a user associated with the DevOps workflow, that the user is authorized to access one or more backend DevOps tools, may access, via a DevOps orchestration engine, the one or more backend DevOps tools to automatically perform the task using the one or more backend DevOps tools, may determine that the one or more worker bots have completed the one or more tasks, and may provide, based on determining that the one or more worker bots have completed the one or more tasks, an indication via the collaboration tool that the DevOps workflow request has been processed.

20 Claims, 12 Drawing Sheets

DEVOPS VIRTUAL ASSISTANT PLATFORM

BACKGROUND

Development operations (DevOps) allows enterprises to quickly design, build, test, deploy, and maintain software applications. DevOps accomplishes this by facilitating continuous deployment and release pipeline management, resulting in faster release lifecycles without compromising application quality.

SUMMARY

According to some implementations, a method may include analyzing, by a master bot of a development operations (DevOps) virtual assistant platform, a DevOps workflow request received via a collaboration tool to identify one or more tasks that are to be performed to process the DevOps workflow request; activating, by the master bot, one or more worker bots of the DevOps virtual assistant platform based on the one or more tasks; assigning, by the master bot, the one or more tasks to the one or more worker bots, wherein each task of the one or more tasks is assigned based on a worker bot type of each of the one or more worker bots; verifying, by a worker bot of the one or more worker bots and based on user credentials of a user associated with the DevOps workflow, that the user is authorized to access one or more backend DevOps tools associated with a task, of the one or more tasks, assigned to the worker bot; accessing, by the worker bot and via a DevOps orchestration engine of the DevOps virtual assistant platform, the one or more backend DevOps tools to automatically perform the task using the one or more backend DevOps tools; determining, by the DevOps virtual assistant platform, that the one or more worker bots have completed the one or more tasks; and providing, by the DevOps virtual assistant platform and based on determining that the one or more worker bots have completed the one or more tasks, an indication via the collaboration tool that the DevOps workflow request has been processed.

According to some implementations, a DevOps virtual assistant platform may include one or more memories; and one or more processors, communicatively coupled to the one or more memories, configured to: analyze, using a master bot, a DevOps workflow request received via a collaboration tool to identify one or more intent classifications and one or more entities associated with the DevOps workflow request, wherein the DevOps workflow request is analyzed using a natural language processing machine learning model; determine, using the master bot, that a confidence score for the one or more intent classifications satisfies a threshold; identify, using the master bot and based on determining that the confidence score for the one or more intent classifications satisfies the threshold, one or more tasks that are to be performed to process the DevOps workflow request; activate, using the master bot, one or more worker bots of the DevOps virtual assistant platform based on the one or more tasks; assign, using the master bot, the one or more tasks to the one or more worker bots, wherein each task of the one or more tasks is assigned based on a worker bot type of each of the one or more worker bots; verify, using a worker bot of the one or more worker bots and based on user credentials of a user associated with the DevOps workflow, that the user is authorized to access one or more backend DevOps tools associated with a task, of the one or more tasks, assigned to the worker bot; access, using the worker bot and via a DevOps orchestration engine of the DevOps virtual assistant platform, the one or more backend DevOps tools to automatically perform the task using the one or more backend DevOps tools; determine that the one or more worker bots have completed the one or more tasks; and provide, based on determining that the one or more worker bots have completed the one or more tasks, an indication via the collaboration tool that the DevOps workflow request has been processed.

According to some implementations, a non-transitory computer-readable medium may store one or more instructions. The one or more instructions, when executed by one or more processors of a DevOps virtual assistant platform, may cause the one or more processors to: analyze, using a master bot, a DevOps workflow request received via a collaboration tool to identify one or more tasks that are to be performed to process the DevOps workflow request; activate, using the master bot, one or more worker bots of the DevOps virtual assistant platform based on the one or more tasks; assign, using the master bot, the one or more tasks to the one or more worker bots, wherein each task of the one or more tasks is assigned based on a worker bot type of each of the one or more worker bots; verify, using a worker bot of the one or more worker bots and based on user credentials of a user associated with the DevOps workflow, that the user is authorized to access one or more backend DevOps tools associated with a task, of the one or more tasks, assigned to the worker bot; access, using the worker bot and via a DevOps orchestration engine of the DevOps virtual assistant platform, the one or more backend DevOps tools to automatically perform the task using the one or more backend DevOps tools; determine, using the DevOps virtual assistant platform, that the one or more worker bots have completed the one or more tasks; provide, using the DevOps virtual assistant platform and based on determining that the one or more worker bots have completed the one or more tasks, an indication via the collaboration tool that the DevOps workflow request has been processed; and generate, for display, a bot management and monitoring interface that includes at least one of: a visual display of a respective status for each of the one or more worker bots, a visual display of historical availability of the worker bot, a visual display of a respective status for each of the task and other tasks assigned to the worker bot, or a visual display of whether the task and the other tasks were completed successfully.

DETAILED DESCRIPTION

Figure 1A:
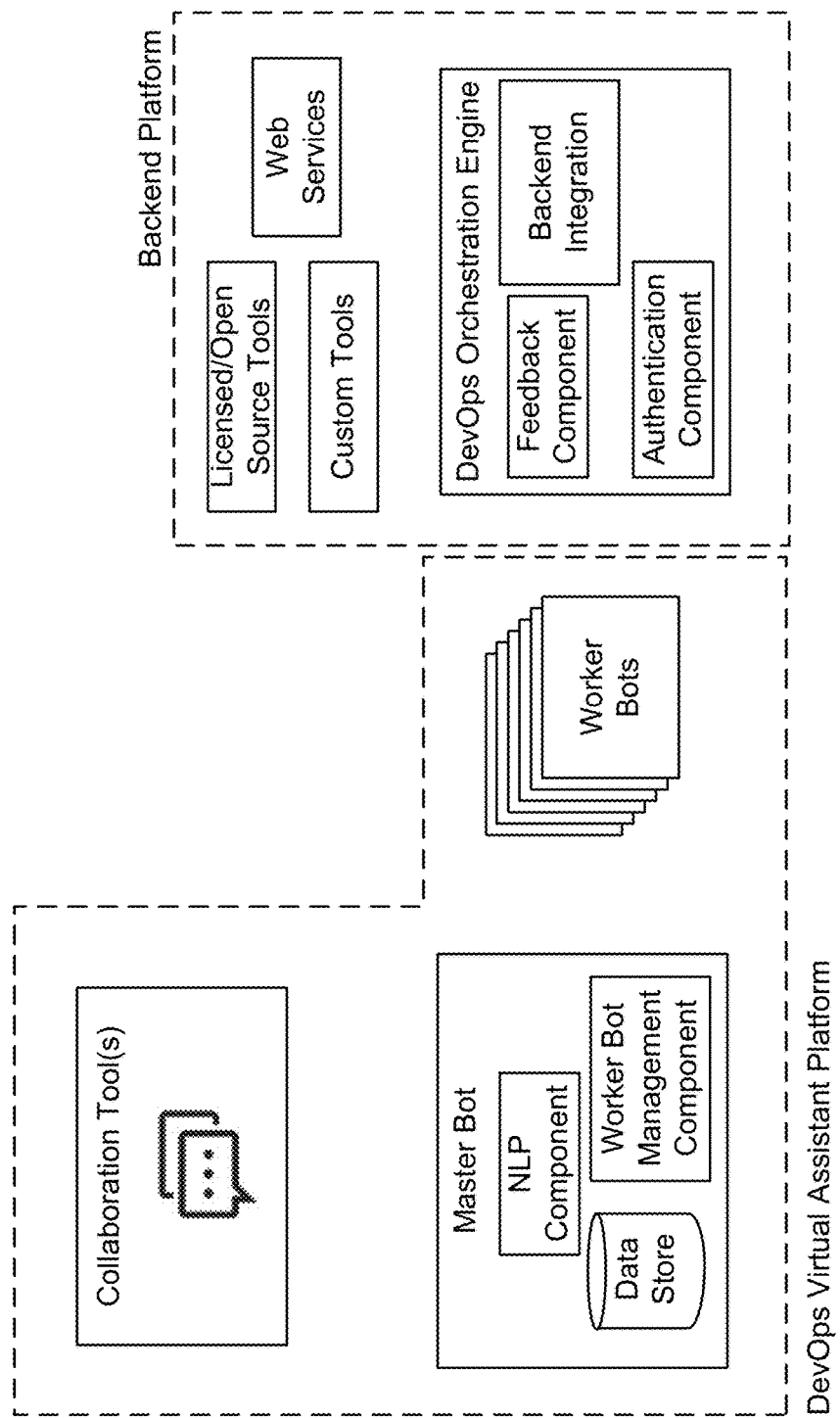
FIGS. 1A-1G are diagrams of one or more example implementations described herein.
Figure 1A:
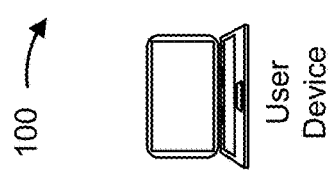

The following detailed description of example implementations refers to the accompanying drawings. The same reference numbers in different drawings may identify the same or similar elements.

Development operations (DevOps) application development and/or application deployment can be arduous and time consuming processes due to the complexity of workflows of the DevOps processes. Accordingly, extensive resources (e.g., computing resources, network resources, and/or the like) may be consumed and wasted in the development and/or deployment of a product, such as an application or other type of product.

According to some implementations described herein, a DevOps virtual assistant platform is provided to automate DevOps workflows (e.g., development processes, deployment processes, and/or the like), increase the efficiency of DevOps workflows, decrease the complexity of DevOps workflows, and/or the like associated with development, deployment, and/or maintenance of an application. As described herein, the DevOps virtual assistant platform may enable customized conversational experiences with users (e.g., DevOps engineers, application developers, and/or the like) through text and/or voice interaction. Accordingly, rather than having to submit a form and/or query, waiting for the form or query to be processed by a customer service department/representative and/or technical support department/representative, the DevOps virtual assistant platform, as described herein, may enable an end user to ask questions or provide concerns with a computer-based application and/or may provide corresponding responses to permit the end user to receive answers to the questions and/or to address the concerns. In this way, the end user may receive relatively faster turnaround time, preventing a waste of resources during idle time associated with the application. For example, the turnaround time may be reduced from months (e.g., six or more) to days or hours. Additionally, the DevOps virtual assistant platform may reduce and/or eliminate errors associated with human technical or customer support representatives.

In some implementations, the DevOps virtual assistant platform may process DevOps workflow requests using a master bot/worker bot framework. The master bot of the DevOps virtual assistant platform may use natural language processing techniques and machine learning models to identify and assign tasks to worker bots, which may be scalable to automatically perform the tasks based on the size of the DevOps workflow request to be processed. The master bot may be flexibly integrated with different natural language processing platforms, and may store and analyze conversations associated with previously handled DevOps workflow requests to improve the performance of subsequent DevOps workflow request handling.

The master bot may be self-learning in that the master bot may be capable of automatically generating responses and/or follow-up inquiries regarding a received DevOps workflow request based on the results of the same or similar DevOps workflow requests previously handled by the DevOps virtual assistant platform.

The worker bots are capable of interfacing with external backend DevOps tools, through a DevOps orchestration engine of the backend platform, to control and cause the backend DevOps tools to automatically execute code bases, execute actions and/or tasks, and/or the like in order to perform the tasks assigned to the worker bots. Each worker bot may track and manage authorization of users to access and use the backend DevOps tools.

The master bot may activate different types of worker bots depending on the DevOps workflow request to be processed, and worker bots may be containerized microservices such that different types of worker bots may be easily added and scaled at the DevOps virtual assistant platform to handle new types of tasks. Moreover, the worker bots may utilize plugins and feedback functionality hosted by the DevOps orchestration engine to increase efficiency of performing tasks. The DevOps orchestration engine may coordinate the sequencing of tasks to be performed such that a DevOps workflow request is processed in an efficient manner, which conserves computing resources that would otherwise be wasted by processing the DevOps workflow request in a less efficient manner.

FIGS. 1A-1G are diagrams of one or more example implementations 100 described herein. As shown in FIG. 1A, example implementation(s) 100 may include a DevOps virtual assistant platform, a user device, a backend platform, and/or other devices, component, and/or systems. The user device may include a device that is capable of providing inputs to the DevOps virtual assistant platform, capable of communicating with other user devices via the DevOps virtual assistant platform, capable of receiving outputs from the DevOps virtual assistant platform, and/or the like. In some implementations, the user device may communicate with the DevOps virtual assistant platform via a network (e.g., a wired or wireless network).

The backend platform may include one or more devices capable of hosting various DevOps tools. For example, the backend platform may be an on-premise system, a cloud-implemented platform, a platform implemented in a data center, and/or the like that is capable of hosting and/or providing access to backend DevOps tools. The backend DevOps tools may include licensed tools (e.g., tools that are licensed from third party developers), open source tools (e.g., tools that are provided for open source use), custom tools (e.g., tools that are developed specifically for a particular entity), web services (e.g., tools that are provided through a web interface), and/or the like. Moreover, the backend platform may host a DevOps orchestration engine.

The DevOps virtual assistant platform may include one or more devices capable of communicating with the user device to receive inputs such as DevOps workflow requests from the user device, capable of processing the DevOps workflow requests, capable of providing status updates regarding DevOps workflow requests, and/or the like. The DevOps virtual assistant platform may include various components, such as one or more collaboration tools, a master bot, a plurality of worker bots, and/or other components.

The collaboration tools may include various chat-based collaboration platforms, video-based collaboration platforms, voice or audio based collaboration platforms, and/or collaboration platforms that provide a combination thereof. Examples of collaboration tools include Microsoft Teams, Skype, Slack, Rocket Chat, voice assistants, custom developed chat user interface, and/or the like. A collaboration tool may permit the user device to communicate with other user devices, may permit the user device to communicate with the DevOps virtual assistant platform, and/or the like.

In some implementations, the user device may provide a DevOps workflow request (e.g., a request to perform a particular DevOps workflow associated with development and/or deployment of a software application) to the DevOps virtual assistant platform via a collaboration tool, may provide requests for status updates associated with a DevOps workflow request via a collaboration tool, may provide feedback and/or additional information associated with a DevOps workflow request to the DevOps virtual assistant platform via a collaboration tool, and/or the like. In some implementations, the DevOps virtual assistant platform may provide status and/or completion updates associated with a DevOps workflow request to the user device via a collaboration tool, may provide requests for additional information for a DevOps workflow request to the user device via the collaboration tool, and/or the like.

The master bot may include one or more components capable of receiving a DevOps workflow request from the user device via a collaboration tool, one or more components (e.g., a natural language processing (NLP) component) capable of analyzing a DevOps workflow request using one or more natural language processing and/or machine learning models to identify one or more tasks that are to be performed to process the DevOps workflow request, one or more components (e.g., a worker bot management component) capable of activating and assigning tasks to worker bots, one or more components (e.g., a data store) capable of storing conversations (e.g., conversations between the user device and the DevOps virtual assistant platform) associated with a DevOps workflow request and analyzing the conversations to identify process improvements for handling the same or similar DevOps workflow requests, and/or the like.

The master bot connects to different worker bots and permits the user device to access different information and perform different tasks and/or actions. In this way, the master bot collaborates with the worker bots in order to process DevOps workflow requests. The master bot provides a flexible framework to work with different natural language processing platforms and/or conversational artificial intelligence, such as Rasa, Dialogflow, language understanding intelligent service (LUIS), and/or the like.

The worker bots may each include one or more components capable of performing tasks associated with DevOps workflow requests. In some implementations, worker bots may be developed in various programming languages and/or using various technologies in a manner that permits each worker bot to be hosted by the DevOps virtual assistant platform as a microservice. In this way, each worker bot may be containerized (e.g., may be a containerized microservice) such that the worker bot framework is scalable to handle various sizes and compositions of DevOps workflow requests, which supports continuous integration, continuous delivery, and continuous deployment capabilities, while maintaining resiliency (e.g., if one containerized microservice is deactivated, other containerized microservices are not affected and another containerized microservice can be activated so that tasks may be offloaded from the deactivated containerized microservice).

In some implementations, the worker bots may be task or process specific. For example, a worker bot may be developed and/or configured to perform a particular type of task. In this way, the worker bots are focused on increasing the speed and automations for different tasks. Examples of task types include a continuous integration continuous deployment (CI/CD) pipeline task, a deployment task, an environment task, an incident tracking task, an access management task, an audit task, a wiki task, and/or another type of task.

A worker bot configured to handle CI/CD pipeline tasks may generate and/or trigger code development pipelines associated with a DevOps workflow request, which may include controlling external systems (e.g., backend DevOps tools) and causing external code bases to execute. A worker bot configured to handle deployment tasks may deploy an application associated with a DevOps workflow request (e.g., deployment into a production environment, deployment into a non-production, test, or staging environment, and/or the like). A worker bot configured to handle environment tasks may configure an environment in which an application associated with a DevOps workflow request is to be deployed (e.g., may cause external resources to be brought online, may configure virtual servers and/or other types of resources, may dynamically scale deployment resources, and/or the like). A worker bot configured to handle incident tracking tasks may monitor and intake incidents associated with an application that is associated with a DevOps workflow request, may perform incident triage to assign actions to internal and/or external systems to process and/or resolve an incident, and/or the like.

A worker bot configured to handle access management tasks may perform access provisioning for an application associated with a DevOps workflow request, which may include controlling access to the application, controlling access to particular aspects, components, and/or features of the application, and/or the like. A worker bot configured to handle audit tasks may perform audits associated with an application that is associated with a DevOps workflow request, which may include performing process auditing for the application, performing process validation for the application, performing workflow auditing for the application, performing workflow validation for the application, and/or the like. A worker bot configured to handle wiki tasks may provide information accessibility for an application associated with a DevOps workflow request, may search a knowledge database for information associated with the application, may generate and maintain a knowledge database for the application, and/or the like.

The DevOps orchestration engine may include one or more components capable of generating, maintaining, and/or updating workflows associated with tasks that are to be performed by the worker bots. Moreover, the DevOps orchestration engine may include one or more components (e.g., an authentication component) capable of performing authentication and/or access management for backend DevOps tools hosted by the backend platform and/or for plugins hosted by the DevOps orchestration engine. In this way, the worker bots and DevOps orchestration engine may verify security authorization of users or user devices, and may only permit the worker bots to perform tasks if the user or user device is authorized to perform the task or have access to the backend DevOps tools and/or plugins, which increases security of the DevOps virtual assistant platform.

The DevOps orchestration engine may include one or more components (e.g., a backend integration component) capable of maintaining and facilitating access to the backend DevOps tools for the worker bots. For example, the backend integration component may permit a worker bot to communicate with a backend DevOps tool by issuing commands to the backend DevOps tool to perform one or more actions associated with a task assigned to the worker bot. In some implementations, the backend integration component may permit a worker bot to communicate with a backend DevOps tool by providing representational state transfer (REST) application programing interface (API) calls and/or other types of API calls to the backend DevOps tool. In some implementations, the backend integration tool may add new backend DevOps tool integrations to the DevOps virtual assistant platform, may scale a backend DevOps tool up or down, may disconnect backend DevOps tools from the DevOps virtual assistant platform, and/or the like.

The DevOps orchestration engine may include one or more components (e.g., a feedback component) capable of providing status updates and/or feedback associated with one or more tasks, workflows, authentication events, and/or the like to the user device via the collaboration tools. For example, the feedback component may provide, via a collaboration tool, an indication that a task associated with a DevOps workflow request is assigned, in process, and/or completed or resolved. As another example, the feedback component may provide, via a collaboration tool, an indication that a task failed or was successful and information associated with the performance of the task. As another example, the feedback component may provide, via a collaboration tool, an indication that authentication of a user or user device failed, and thus the authentication component is not permitted to provide access to a particular backend DevOps tool or plugin.

Figure 1B:
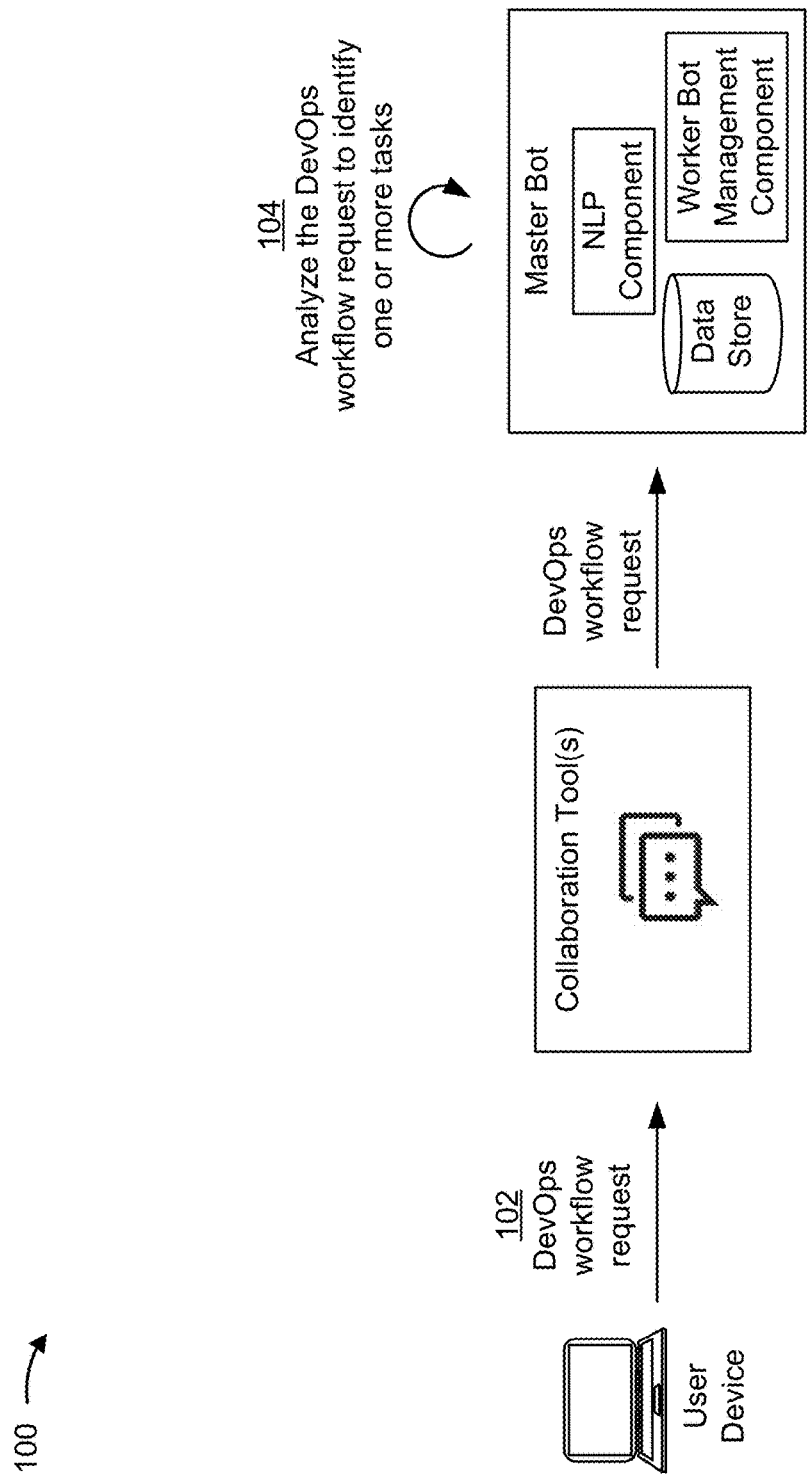

As shown in FIG. 1B, and by reference number 102, to have the DevOps virtual assistant platform process a DevOps workflow request, the user device may provide the DevOps workflow request to the DevOps virtual assistant platform via one or more collaboration tools. In some implementations, the user device may provide the DevOps workflow request via a chat-based collaboration tool, via a voice command-based collaboration tool, and/or the like. In some implementations, a user of the user device may provide the DevOps workflow request as input to the user device, and the user device may provide the DevOps workflow request based on receiving the DevOps workflow request as input, based on being instructed by the user to provide the DevOps workflow request, and/or the like.

In some implementations, the DevOps workflow request may be provided to the master bot via the collaboration tool(s). For example, the user device may provide the DevOps workflow request in a chat window dedicated to the master bot or DevOps virtual assistant platform. As another example, the user device may be communicating in a chat window with another user device, and may provide the DevOps workflow request in the chat window between the user device and the other user device. In this case, the user device may signal to the master bot or DevOps virtual assistant platform that the DevOps workflow request is directed to the master bot or DevOps virtual assistant platform by specifically calling out the master bot or DevOps virtual assistant platform in the chat window and/or DevOps workflow request.

As further shown in FIG. 1B, and by reference number 104, the master bot may receive the DevOps workflow request and may analyze the DevOps workflow request to identify one or more tasks that are to be performed to process the DevOps workflow request. In this case, the master bot may use the NLP component to analyze the DevOps workflow request using natural language processing. For example, the NLP component may analyze the DevOps workflow request using one or more natural language processing and/or machine learning models or algorithms to extract words from the DevOps workflow request and to assign meanings to the words and/or to the context of the DevOps workflow request.

In some implementations, the NLP component may analyze the DevOps workflow request by parsing the DevOps workflow request to identify one or more words or phrases (e.g., written words or phrases in a chat window of a collaboration tool, spoken words or phrases received at a voice-based collaboration tool, and/or the like) included in the DevOps workflow request. The NLP component may use a natural language processing and/or machine learning model to identify one or more intent classifications and one or more entities based on the one or more words or phrases. The natural language processing and/or machine learning model may be trained on historical intent classifications identified and/or confirmed in previous DevOps workflow requests to increase the accuracy of the natural language processing and/or machine learning model. Moreover, the natural language processing and/or machine learning model may be trained on historical conversations with the user associated with the DevOps workflow request to further increase the accuracy of the natural language processing and/or machine learning model for the DevOps workflow request.

An intent classification may be a description or indication of the intent or purpose that is to be achieved for the DevOps workflow request. For example, the DevOps workflow request may include the text "Deploy to UAT," in which case the NLP component may determine that the intent classification of the DevOps workflow request is to deploy an entity (e.g., a software application). In some implementations, the NLP component may generate a confidence score for each intent classification. A confidence score for an intent classification may indicate the confidence of the natural language processing and/or machine learning model that the intent classification is the correct intent classification for the DevOps workflow request. Confidence scores may be increased by increasing the amount of training data (e.g., historical intent classifications identified and/or confirmed in previous DevOps workflow requests) that the natural language processing and/or machine learning model is trained on.

In some implementations, if the NLP component determines that a confidence score for an intent classification does not satisfy a confidence score threshold (e.g., 80% confidence, 95% confidence, and/or the like), the master bot may provide a request (e.g., via the collaboration tool(s)) to the user or user device for further clarification and/or additional information, and may generate a new confidence score based on receiving the clarification and/or additional information. In some implementations, if the NLP component determines that a confidence score for an intent classification satisfies the confidence score threshold, the master bot may proceed with identifying tasks for processing the DevOps workflow request.

The NLP component may further identify entities in the DevOps workflow request. Continuing with the example above, the NLP component may identify "UAT" as an entity (e.g., a user acceptance testing environment in which a software application is to be deployed). In some implementations, the NLP component may identify the tasks that are to be performed in order to process the DevOps workflow request based on intent classifications and the entities. For example, a task may include performing the intent classification on an entity identified in the DevOps workflow request, may include performing the intent classification in the context of an entity identified in the DevOps workflow request, and/or the like.

In some implementations, the tasks associated with the DevOps workflow request may include deploying an application associated with the DevOps workflow request in a non-production or production environment, configuring one or more deployment environment parameters for the application, performing incident monitoring for the application, providing process and workflow auditing and validation for the application, deploying one or more virtual machines, and/or other CI/CD pipeline tasks, deployment tasks, environment tasks, incident tracking tasks, access management tasks, audit tasks, wiki tasks, and/or the like.

In some implementations, the NLP component may determine that further clarification or additional information from the user or user device is needed in order to identify intent classifications, entities, and/or tasks for the DevOps workflow request. For example, and continuing with the "Deploy to UAT" DevOps workflow request example above, the NLP component may determine an intent classification of "deploy" and an entity of "UAT," but may be unable to determine the entity that is to be deployed to the UAT based on the text of the DevOps workflow request. In this case, the master bot may provide a request for the clarification or additional information via the collaboration tool(s) to the user or user device, and may receive, based on providing the request, the clarification or additional information via the collaboration tool(s).

Figure 1C:
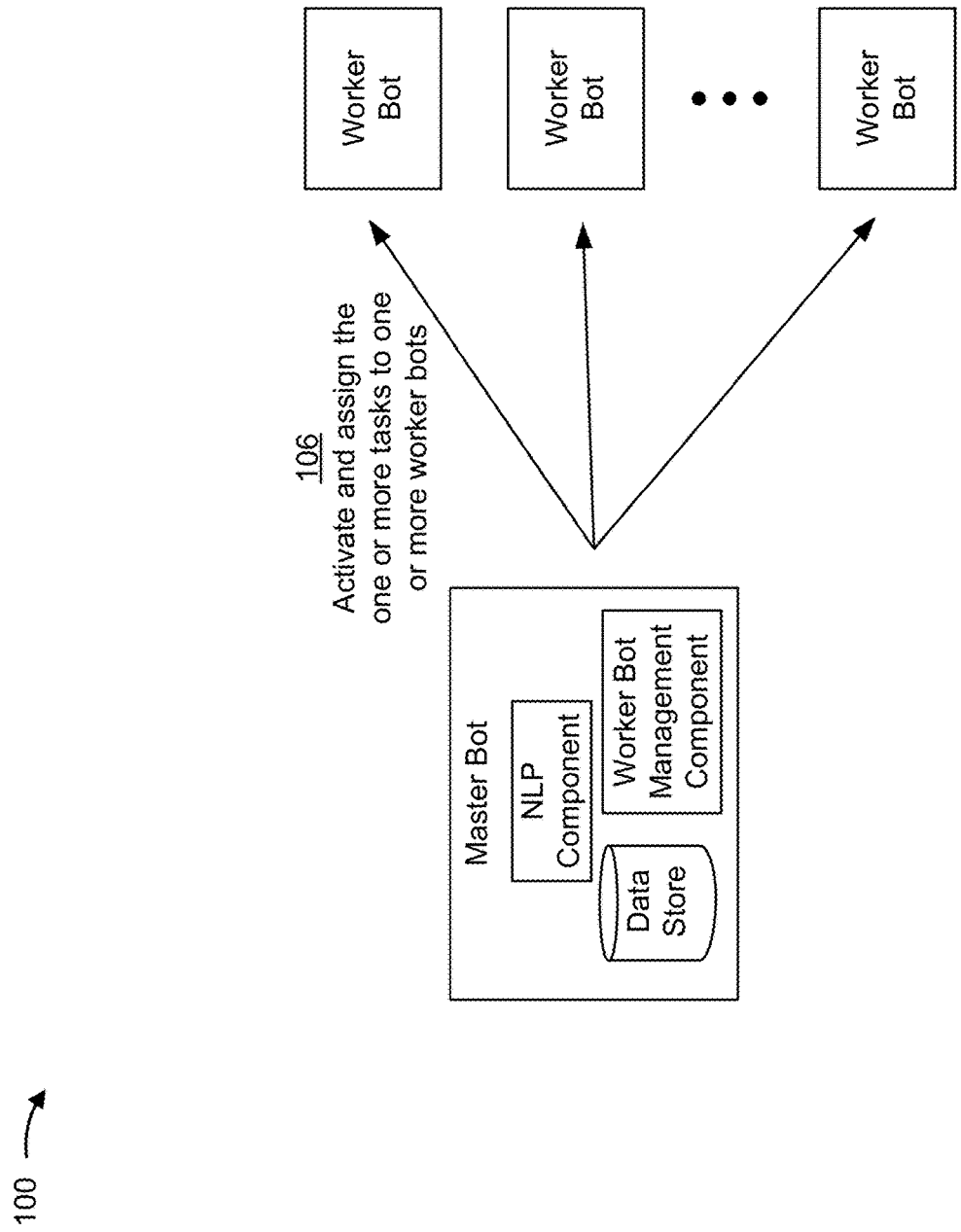

As shown in FIG. 1C, and by reference number 106, the master bot (e.g., via the worker bot management component) may activate and assign the tasks associated with the DevOps workflow request to one or more worker bots. In some implementations, the master bot may assign the tasks to the worker bots based on worker bot types of the worker bots. For example, the master bot may assign CI/CD pipeline tasks to one or more CI/CD pipeline worker bots. As another example, the master bot may assign deployment tasks to one or more deployment worker bots. As another example, the master bot may assign environment tasks to one or more environment worker bots. As another example, the master bot may assign incident tracking tasks to one or more incident tracking worker bots. As another example, the master bot may assign access management tasks to one or more access management worker bots. As another example, the master bot may assign audit tasks to one or more audit worker bots. As another example, the master bot may assign wiki tasks to one or more wiki bots.

In some implementations, the quantity of each type of worker bot that the worker bot management component activates may be based on a size of each type of task to be performed for the DevOps workflow request. In some implementations, the quantity of each type of worker bot that the master bot activates may be based on a quantity of tasks of a particular type to be performed for the DevOps workflow request. In some implementations, the worker bot management component may use a machine learning model to determine the worker bot types and/or quantities to activate. For example, the worker bot management component may be trained on historical worker bot activation and/or assignment data for other DevOps workflow requests that have been processed by the DevOps virtual assistant platform and may determine the worker bot types and/or quantities based on the worker bot types and/or quantities activated for previous DevOps workflow requests and the results that the worker bot types and/or quantities produced for the previous DevOps workflow requests.

Figure 1D:
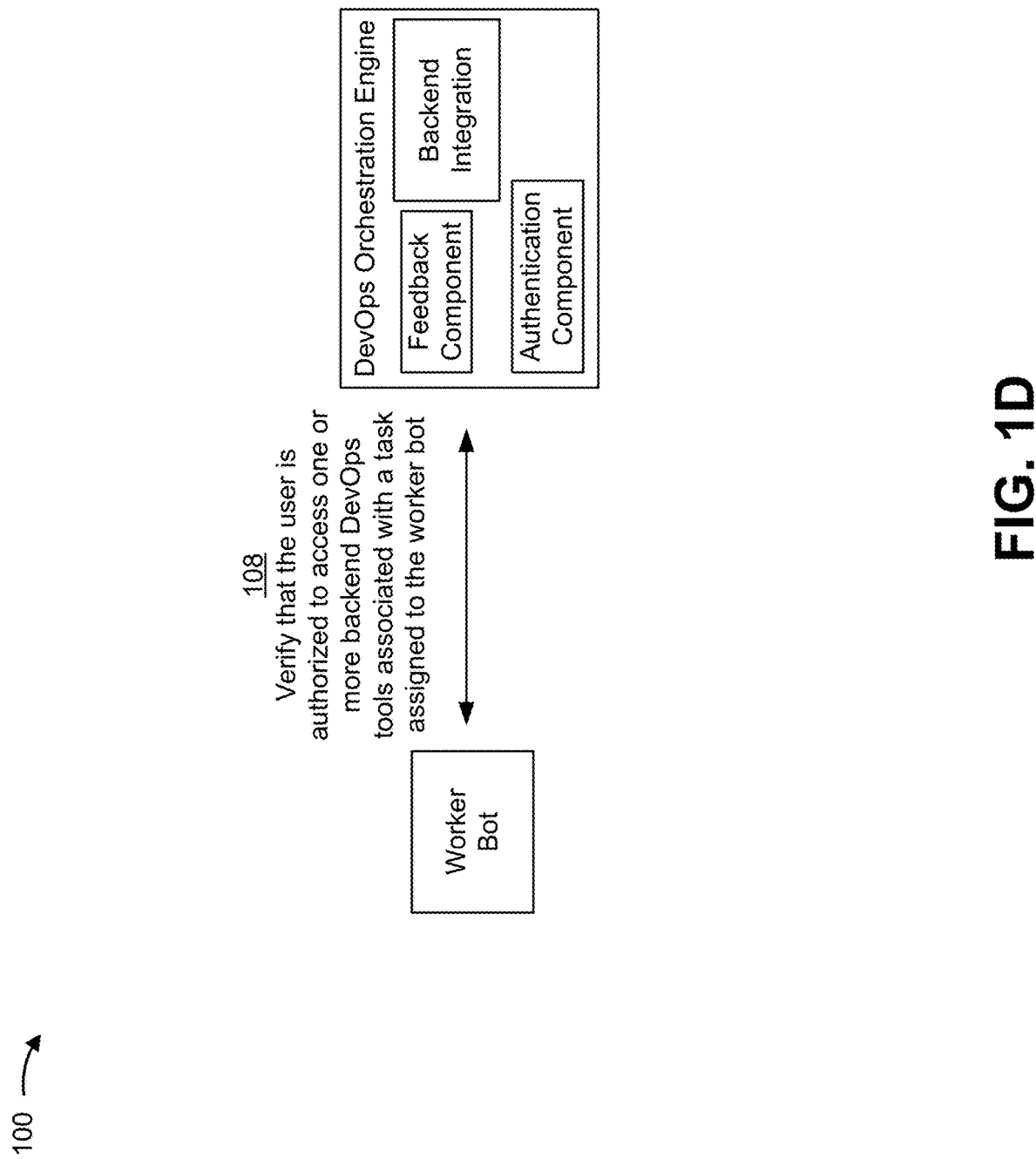

As shown in FIG. 1D, and by reference number 108, a worker bot and the DevOps orchestration engine may verify that the user or user device that provides the DevOps workflow request is permitted or authorized to access one or more backend DevOps tools associated with a task assigned to the worker bot. The other worker bots activated by the master bot may perform similar actions.

To verify that the user or user device is permitted or authorized to access the one or more backend DevOps tools, the worker bot may provide an indication of the task to the DevOps orchestration engine, the DevOps orchestration engine may identify a workflow that is to be performed or executed in order to complete the task, may identify the one or more backend DevOps tools needed for the workflow, and may determine using the authentication component whether the user or user device is permitted or authorized to access the one or more backend DevOps tools. The authentication component may communicate with an authentication server, may search a database of authorized users or devices, and/or may use other techniques to verify that the user or user device is permitted or authorized to access the one or more backend DevOps tools.

In some implementations, the authentication component may use the feedback component to communicate with the user device via the collaboration tool(s) to request user credentials from the user in order to verify that the user or user device is permitted or authorized to access the one or more backend DevOps tools. For example, the authentication component may request a username and password so that the user may log on to the one or more backend DevOps tools, may request an authentication token or cookie, may request a passcode, may request multi-factor authentication, and/or may request another type of authentication information.

Figure 1E:
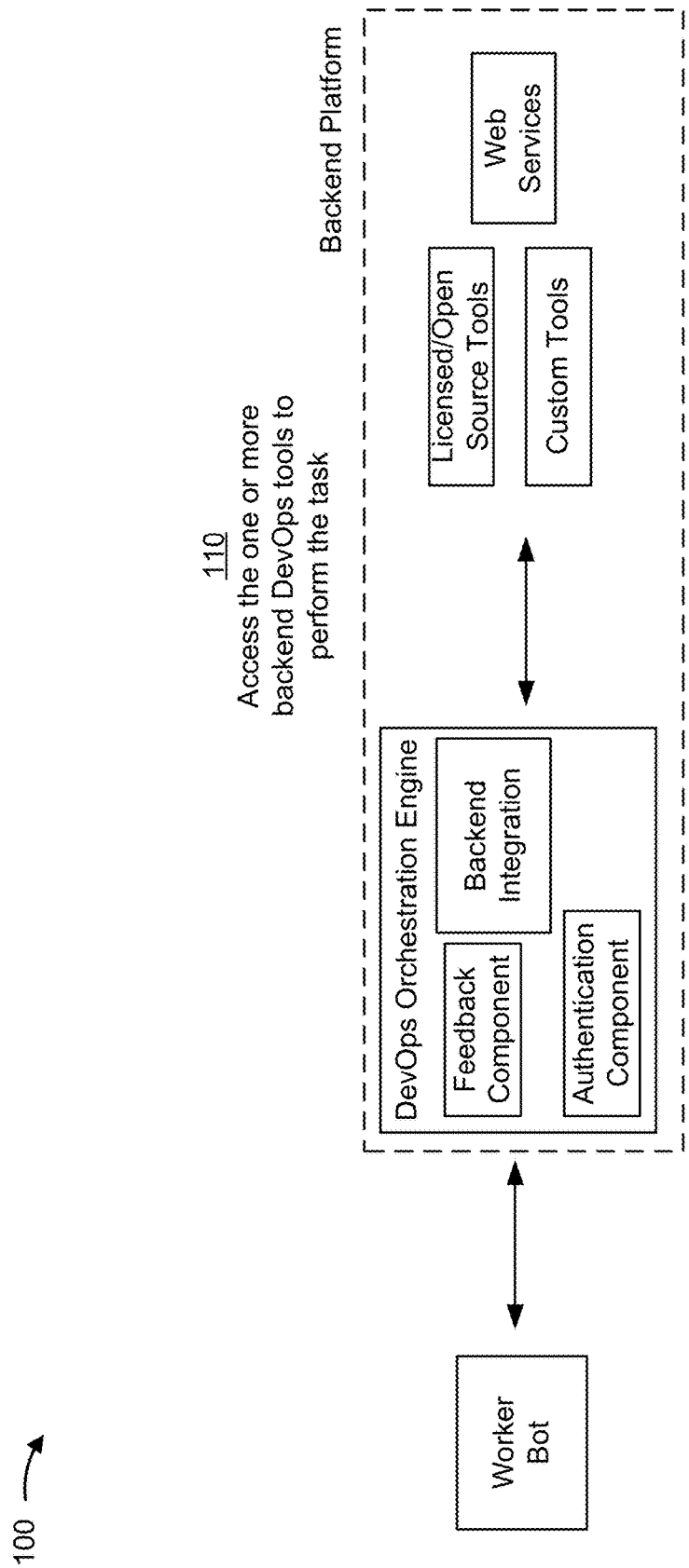

As shown in FIG. 1E, and by reference number 110, if the authentication component of the DevOps orchestration engine verifies that the user or user device is permitted or authorized to access the one or more backend DevOps tools, the DevOps orchestration engine may provide the worker bot with access to the one or more backend DevOps tools to perform the task. The DevOps orchestration engine may perform similar actions for the other worker bots activated by the master bot.

The worker bot may automatically perform the task assigned to the worker bot in that the worker bot (and the other worker bots) performs the task without input or supervision (or with minimal input or supervision) from the user or user device. The worker bot may perform the task assigned to the worker bot by automatically accessing the one or more backend DevOps tools via the DevOps orchestration engine. For example, the backend integration component of the DevOps orchestration engine may permit the worker bot to make REST API calls (or another type of API calls) to the one or more backend DevOps tools. The REST API calls may cause the one or more backend DevOps tools to execute code or a codebase, may cause the one or more backend DevOps tools to deploy virtual servers and/or other types of infrastructure and/or services, may cause the one or more backend DevOps tools to debug or troubleshoot an application associated with the DevOps workflow request, may utilize one or more auditing service backend DevOps tools to audit an application associated with the DevOps workflow request, and/or may perform one or more other actions in order to process the task associated with the worker bot. The other worker bots activated by the master bot may perform similar actions.

In some implementations, the worker bots activated by the master bot may perform tasks associated with the DevOps workflow request in parallel to increase the efficiency of processing the DevOps workflow request, decrease the amount of time that the DevOps virtual assistant platform takes to process the DevOps workflow request, and/or the like. In this case, the master bot may scale worker bots by activating additional worker bots using containerization method of the same worker bot type or of different worker bot types in order to parallelize processing of the tasks.

Figure 1F:
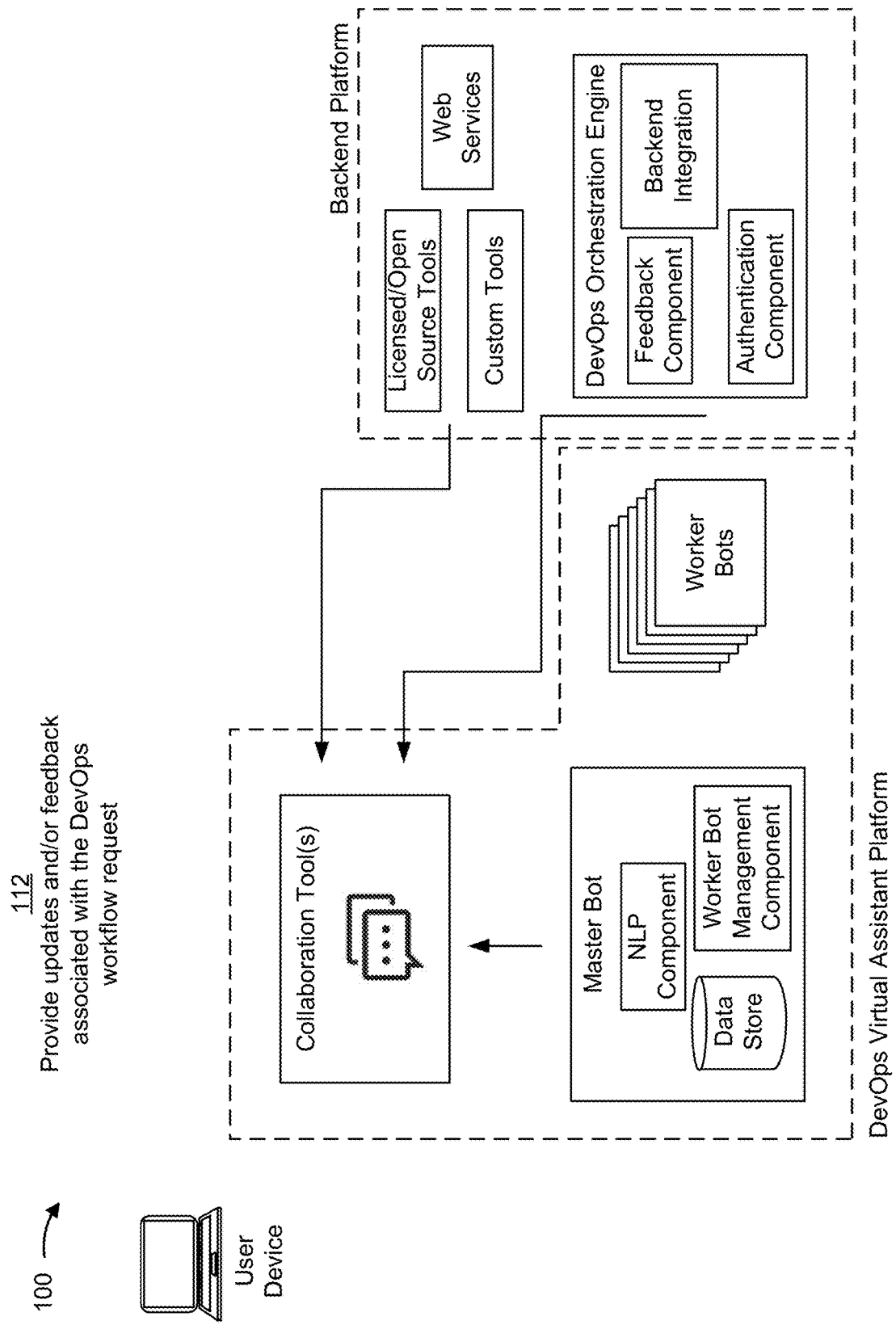

As shown in FIG. 1F, and by reference number 112, the DevOps virtual assistant platform and/or the backend platform may provide updates and/or feedback associated with the DevOps workflow request. In some implementations, the backend platform may provide an indication that one or more backend DevOps tools were accessed as part of processing one or more tasks for the DevOps workflow request, may provide an indication of the status of the one or more backend DevOps tools (e.g., an indication of whether each of the backend DevOps tools is up and running or down, an indication of an availability of each of the backend DevOps tools, and/or the like).

In some implementations, the DevOps virtual assistant platform may provide updates and/or feedback from various sources, such as the master bot, the DevOps orchestration engine, and/or the like. For example, the master bot may provide an indication of the overall status of the DevOps workflow request via the collaboration tool(s), may provide feedback regarding the wording of the DevOps workflow request and/or the ability or confidence of the master bot to parse and understand the intent of the DevOps workflow request, and/or the like. The master bot may track the status of each task associated with the DevOps workflow request, may determine that the worker bots have completed the tasks, and may provide an indication via the collaboration tool(s) that the DevOps workflow request has been processed based on determining that the worker bots have completed the tasks.

As another example, the DevOps orchestration engine may provide updates regarding the status of individual tasks being performed by the worker bots, may provide requests for user credentials (e.g., username and password, a security token, and/or the like) in order to grant or provide access to a particular backend DevOps tool or plugin, may provide feedback regarding the success of a particular task, and/or the like. As another example, the DevOps orchestration engine may provide feedback to the master bot and/or the NLP component so that the master bot and/or NLP component may further train and/or update the natural language processing machine learning model to improve the efficiency and/or accuracy of identifying intent classifications and/or entities in subsequent DevOps workflow requests.

Figure 1G:
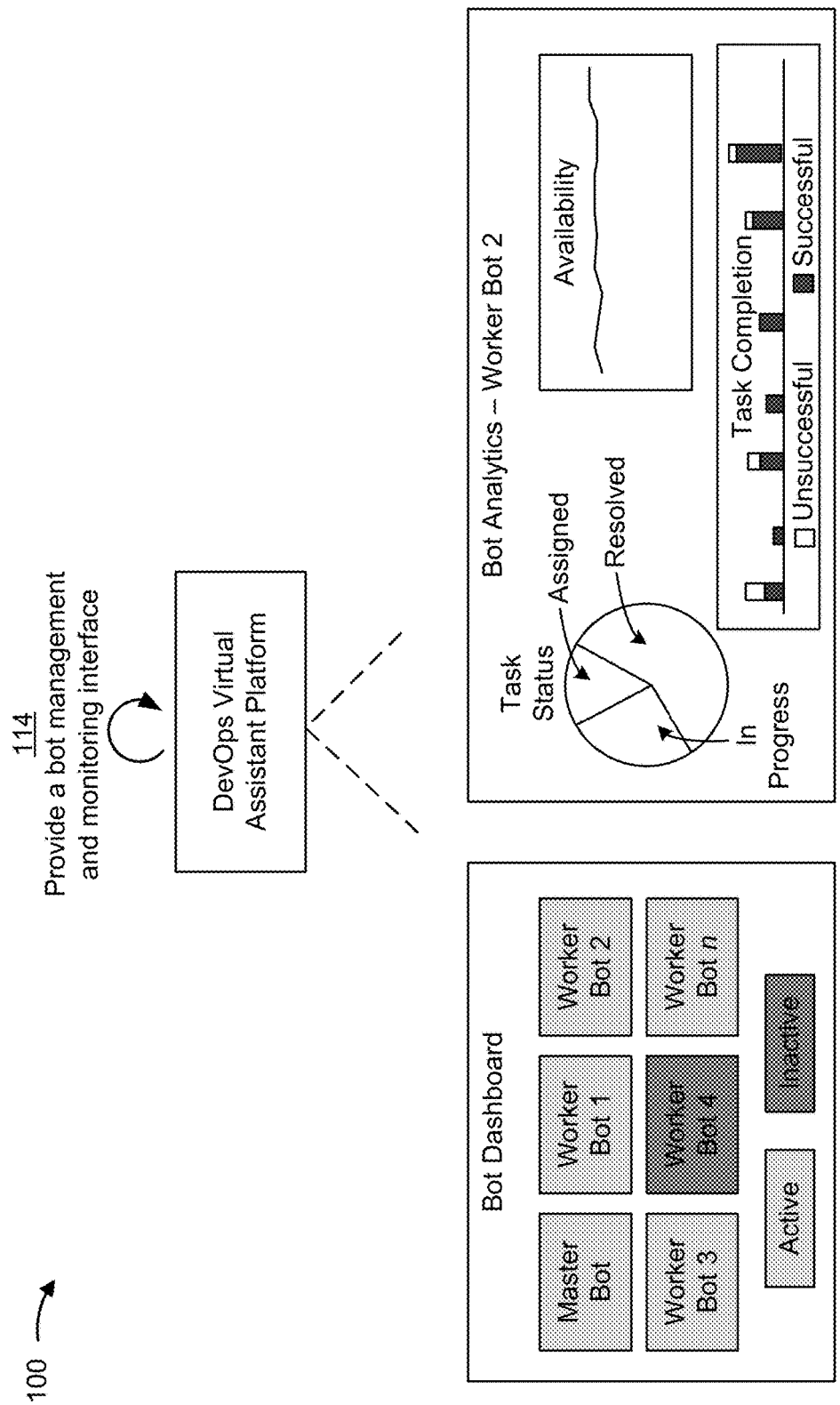

As shown in FIG. 1G, and by reference number 114, the DevOps virtual assistant platform may provide a bot management and monitoring interface via which statistics, statuses, historical performance, and/or other information associated with the master bot and the worker bots may be viewed. The bot management and monitoring interface may be displayed in a graphical user interface, and may include various aspects, such as a bot dashboard, bot analytics, and/or the like.

As shown in FIG. 1G, the bot dashboard may include a visual display of graphical and/or textual information associated with respective statuses of the master bot and each of the worker bots. For example, the bot dashboard may include a visual display of whether a particular bot (e.g., the master bot or a worker bot) is active (e.g., actively working on a DevOps workflow request or task associated with a DevOps workflow request) or inactive (e.g., not actively working on a DevOps workflow request or task associated with a DevOps workflow request). In some implementations, the user device may provide input to the DevOps virtual assistant platform to manually activate, deactivate, or restart the master bot or a worker bot. In some implementations, the DevOps virtual assistant platform may automatically activate, deactivate, or restart the master bot or a worker bot. For example, the DevOps virtual assistant platform may restart the master bot or a worker bot based on determining that the master bot or the worker bot has been inactive for a threshold amount of time.

As further shown in FIG. 1G, the bot analytics may include a visual display of graphical and/or textual information associated with statistics, historical performance, and/or other aspects of a particular bot. In some implementations, the bot management and monitoring interface may provide an input mechanism for selecting a particular bot to view in the bot analytics, such as a drop-down box, a radio button, a check box, an input box, and/or the like. In some implementations, a particular bot may be selected to view in the bot analytics using gestures, voice commands, and/or other types of input.

FIG. 1G illustrates various examples of information that may be displayed as part of bot analytics for a worker bot. Other types of information may additionally and/or alternatively be displayed. In some implementations, the bot analytics may include a visual display of a task status for each of the tasks assigned to the worker bot in a particular time period (e.g., a task status for each of the tasks assigned to the worker bot on a particular day, in a particular week, and/or the like). The visual display may include a chart (e.g., a pie chart, a bar chart, and/or the like), a list, a table or matrix, and/or the like, and may identify the task status of each individual task and/or may identify the quantity of tasks in each task status category. A task status for a particular task may include assigned (e.g., the task has been assigned to the worker bot but is not yet in progress), in progress (e.g., the task has been assigned and is in the process of being executed or performed by the worker bot), resolved (e.g., the task has been successfully completed by the worker bot), and/or the like.

In some implementations, the bot analytics may include a visual display of the availability of the worker bot. The availability of the worker bot may be displayed as a graph (e.g., a line graph), as a percentage, and/or in another format that indicates how available the worker bot has been over a particular period of time. For example, the availability of the worker bot may be indicated as a percentage of the period of time that the worker bot has been up and running and available to take on and process tasks.

In some implementations, the bot analytics may include a visual display of task completion performance of the worker bot. The task completion performance of the worker bot may include a graphical and/or textual indication of a quantity of the tasks assigned to the worker bot that were successfully completed, a quantity of the tasks assigned to the worker bot that were unsuccessfully completed, and/or the like.

In some implementations, the DevOps virtual assistant platform may automatically perform one or more actions associated with the worker bots based on the bot analytics tracked and/or monitored in the bot management and monitoring interface. For example, the DevOps virtual assistant platform may determine that a particular worker bot is assigned a high quantity of tasks (e.g., a quantity of tasks that satisfies a threshold quantity) that have not yet been started or resolved, and may automatically scale up or activate additional worker bots of the same type to process some of the tasks assigned to the worker bot. As another example, the DevOps virtual assistant platform may determine that the availability of a particular worker bot does not satisfy an availability threshold percentage, and may automatically restart the worker bot, may perform repairs or updates on the worker bot, and/or the like. As another example, the DevOps virtual assistant platform may determine that the ratio of successful tasks to unsuccessful tasks for the worker bot does not satisfy a ratio threshold and/or may determine that the quantity of unsuccessful tasks of the worker bot satisfies a threshold, and may automatically perform repairs or updates on the worker bot, may perform analysis of the DevOps workflow and/or task to identify modifications to the actions that the worker bot is to execute in order to perform the task to improve the effectiveness of the task, and/or the like.

In this way, the DevOps virtual assistant platform is provided to automate DevOps workflows (e.g., development processes, deployment processes, and/or the like), increase the efficiency of DevOps workflows, decrease the complexity of DevOps workflows, and/or the like associated with development, deployment, and/or maintenance of an application. The DevOps virtual assistant platform enables customized conversational experiences with users (e.g., DevOps engineers, application developers, and/or the like) through text and/or voice interaction. Accordingly, rather than having to submit a form and/or query, waiting for the form or query to be processed by a customer service department and/or technical support department, the DevOps virtual assistant platform, as described herein, may enable an end user to ask questions or provide concerns with an application and/or may provide corresponding responses to permit the end user to receive answers to the questions and/or to address the concerns. In this way, the end user may receive relatively faster turnaround time, preventing a waste of computing resources during idle time associated with the application. For example, the turnaround time may be reduced from months (e.g., six or more) to days or hours.

As indicated above, FIGS. 1A-1G are provided merely as one or more examples. Other examples may differ from what is described with regard to FIGS. 1A-1G.

Figure 2:
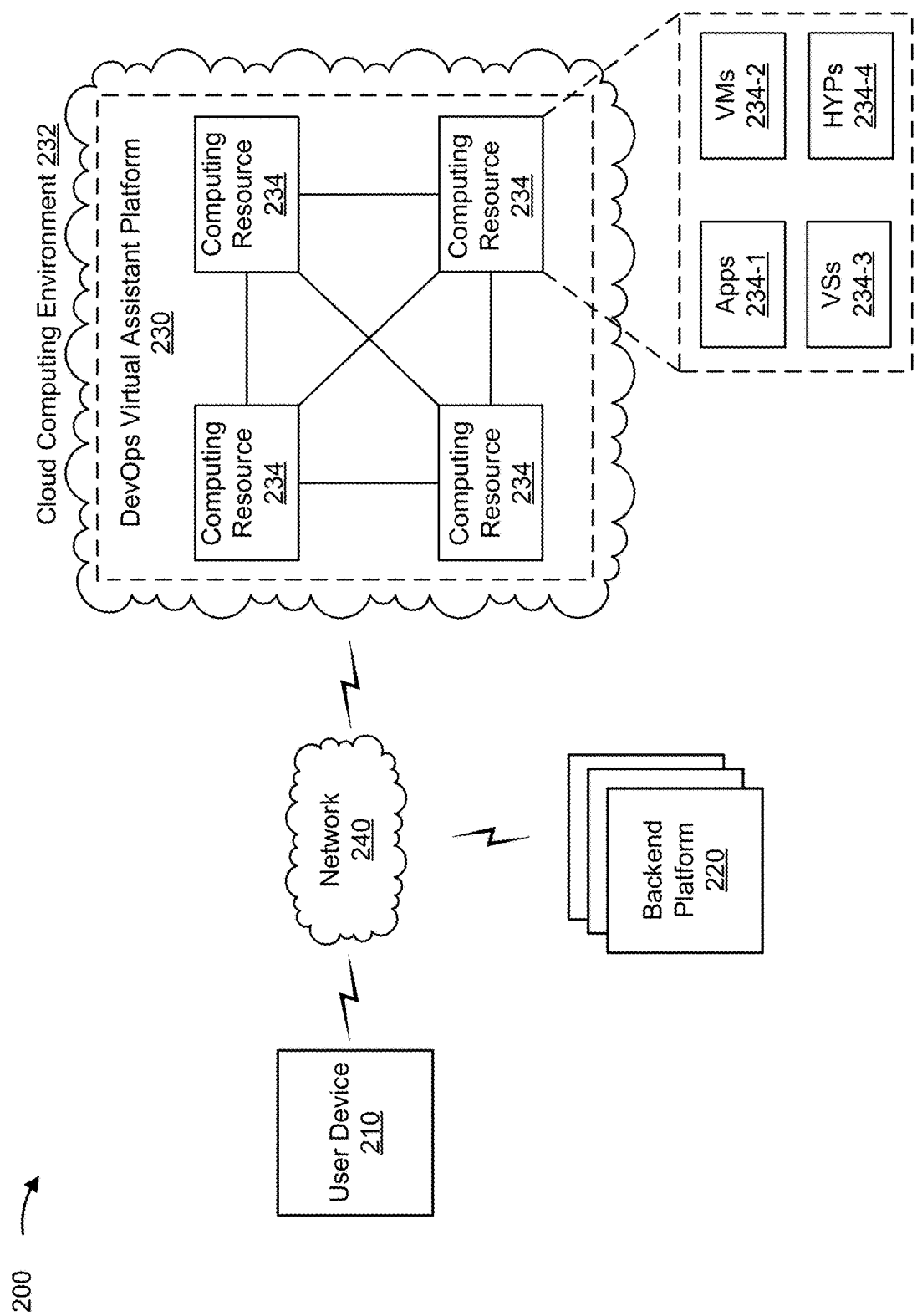
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a backend platform 220, a DevOps virtual assistant platform 230, and a network 240. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, and/or the like), a laptop computer, a tablet computer, a handheld computer, a gaming device, a wearable communication device (e.g., a smart wristwatch, a pair of smart eyeglasses, and/or the like), a desktop computer, or a similar type of device. In some implementations, user device 210 may receive input from a user. In some implementations, the input may include input identifying a DevOps workflow request. User device 210 may provide the DevOps workflow request to DevOps virtual assistant platform 230 via network 240. In some implementations, user device 210 may communicate with DevOps virtual assistant platform 230 via a collaboration tool of DevOps virtual assistant platform 230. For example, user device 210 may provide further input associated with a DevOps workflow request via the collaboration tool, may provide a request for a status of a DevOps workflow request via the collaboration tool, may provide a request to view a bot management and monitoring interface via the collaboration tool, and/or the like.

Backend platform 220 includes one or more devices capable of receiving, storing, and/or providing information, such as information described herein. For example, backend platform may include a server device, a desktop computer, a cloud-based platform, an on-premise platform, or a similar type of device. In some implementations, backend platform 220 may host various backend DevOps tools, such as one or more licensed or open source application development and/or deployment tools, one or more custom application development and/or deployment tools, one or more web services, and/or the like.

In some implementations, backend platform 220 may communicate with DevOps virtual assistant platform 230 via an orchestration engine of DevOps virtual assistant platform 230, may communicate with user device 210 via a collaboration tool of DevOps virtual assistant platform 230, and/or the like. For example, backend platform 220 may communicate with DevOps virtual assistant platform 230 via an orchestration engine to receive tasks, portions of tasks, portions of DevOps workflows, and/or the like to execute using one or more of the backend DevOps tools hosted by backend platform 220. As another example, backend platform 220 may communicate with user device 210 to provide status updates on tasks, portions of tasks, portions of DevOps workflows being executed by the one or more of the backend DevOps tools hosted by backend platform 220, may provide feedback associated with tasks, portions of tasks, portions of DevOps workflows being executed by the one or more of the backend DevOps tools hosted by backend platform 220, and/or the like.

DevOps virtual assistant platform 230 includes one or more devices capable of identifying or receiving input identifying a target role for a user (e.g., from user device 210 and/or another device), capable of analyzing, using a master bot, a DevOps workflow request received via a collaboration tool to identify one or more tasks that are to be performed to process the DevOps workflow request, activating, using the master bot, one or more worker bots of the DevOps virtual assistant platform based on the one or more tasks, assigning, using the master bot, the one or more tasks to the one or more worker bots, verifying, using a worker bot based on user credentials of a user associated with the DevOps workflow, that the user is authorized to access one or more backend DevOps tools associated with a task, of the one or more tasks, assigned to the worker bot, accessing, using the worker bot and via a DevOps orchestration engine of the DevOps virtual assistant platform, the one or more backend DevOps tools to automatically perform the task using the one or more backend DevOps tools, determining that the one or more worker bots have completed the one or more tasks, providing, based on determining that the one or more worker bots have completed the one or more tasks, an indication via the collaboration tool that the DevOps workflow request has been processed, and/or the like.

In some implementations, DevOps virtual assistant platform 230 may be designed to be modular such that certain software components may be swapped in or out depending on a particular need. As such, DevOps virtual assistant platform 230 may be easily and/or quickly reconfigured for different uses. In some implementations, DevOps virtual assistant platform 230 may receive information from and/or transmit information to user device 210, backend platform 220, and/or the like.

In some implementations, as shown, DevOps virtual assistant platform 230 may be hosted in a cloud computing environment 232. Notably, while implementations described herein describe DevOps virtual assistant platform 230 as being hosted in cloud computing environment 232, in some implementations, DevOps virtual assistant platform 230 may not be cloud-based (i.e., may be implemented outside of a cloud computing environment) or may be partially cloud-based. Cloud computing environment 232 includes an environment that hosts DevOps virtual assistant platform 230. Cloud computing environment 232 may provide computation, software, data access, storage, etc. services that do not require end-user knowledge of a physical location and configuration of system(s) and/or device(s) that hosts DevOps virtual assistant platform 230. As shown, cloud computing environment 232 may include a group of computing resources 234 (referred to collectively as "computing resources 234" and individually as "computing resource 234").

Computing resource 234 includes one or more personal computers, workstation computers, server devices, or other types of computation and/or communication devices. In some implementations, computing resource 234 may host DevOps virtual assistant platform 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 includes a group of cloud resources, such as one or more applications ("APPs") 234-1, one or more virtual machines ("VMs") 234-2, virtualized storage ("VSs") 234-3, one or more hypervisors ("HYPs") 234-4, and/or the like.

Application 234-1 includes one or more software applications that may be provided to or accessed by one or more other devices. Application 234-1 may eliminate a need to install and execute the software applications on the one or more other devices. For example, application 234-1 may include software associated with DevOps virtual assistant platform 230 and/or any other software capable of being provided via cloud computing environment 232. In some implementations, one application 234-1 may send/receive information to/from one or more other applications 234-1, via virtual machine 234-2.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user (e.g., a user of another device or an operator of DevOps virtual assistant platform 230), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 may provide hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
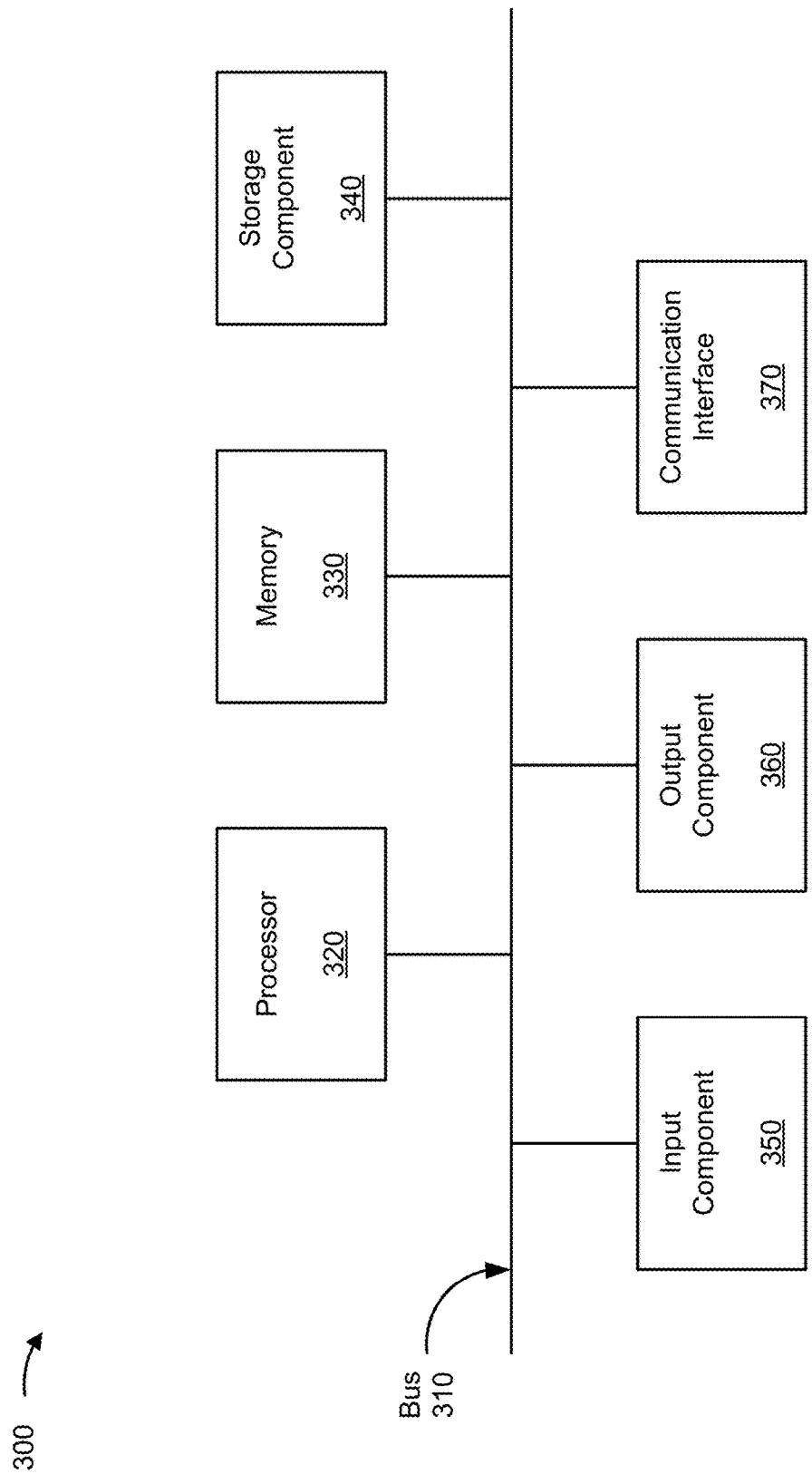
FIG. 3 is a diagram of example components of one or more devices of FIG. 2.

FIG. 3 is a diagram of example components of a device 300. Device 300 may correspond to user device 210, backend platform 220, DevOps virtual assistant platform 230, computing resource 234, and/or one or more devices included in network 240. In some implementations, user device 210, backend platform 220, DevOps virtual assistant platform 230, computing resource 234, and/or one or more devices included in network 240 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among multiple components of device 300. Processor 320 is implemented in hardware, firmware, and/or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
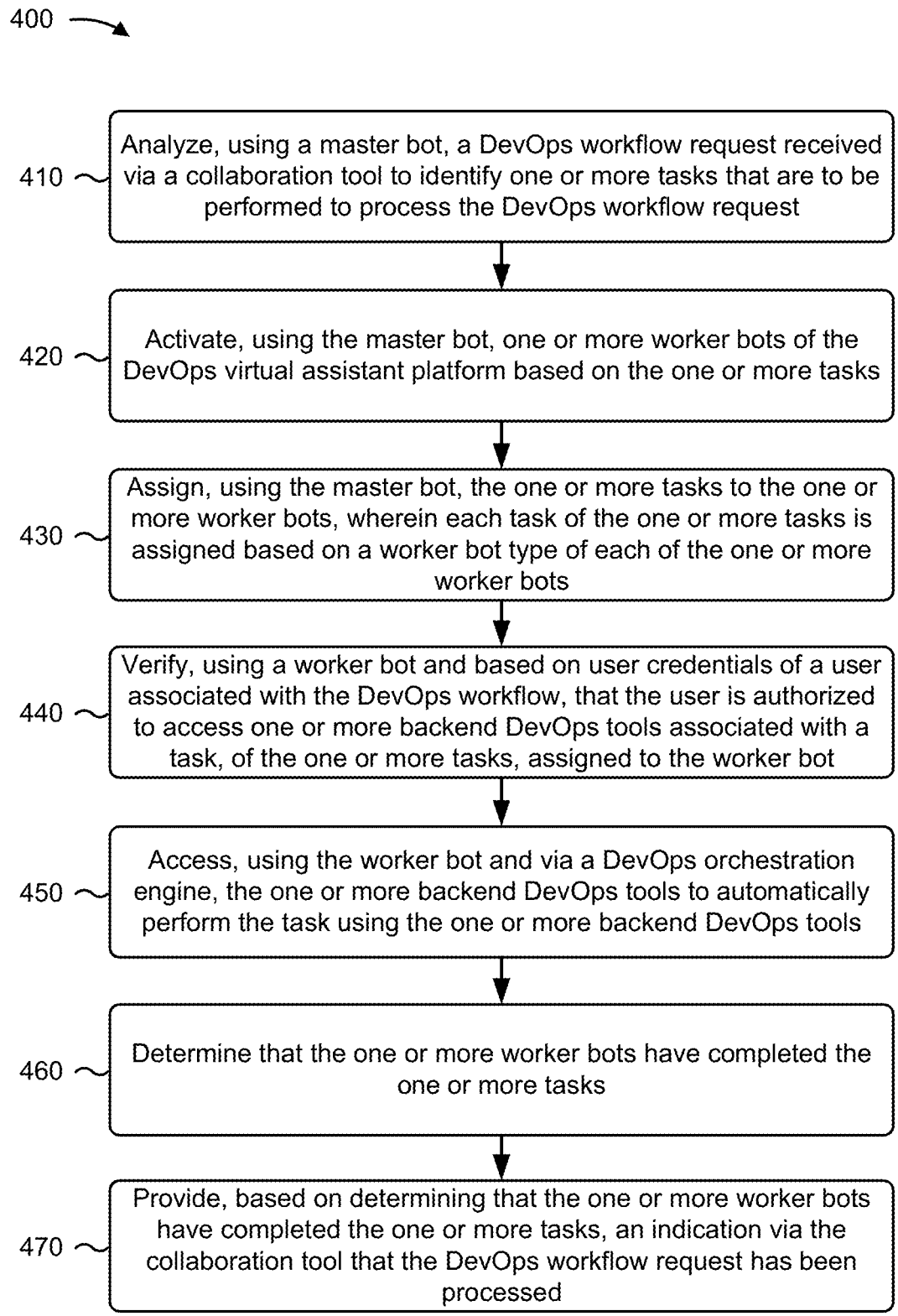
FIGS. 4-6 are flow charts of example processes for processing a development operations (DevOps) workflow request using a DevOps virtual assistant platform.

FIG. 4 is a flow chart of an example process 400 for processing a DevOps workflow request using a DevOps virtual assistant platform. In some implementations, one or more process blocks of FIG. 4 may be performed by a DevOps virtual assistant platform (e.g., DevOps virtual assistant platform 230, device 300, and/or the like). In some implementations, one or more process blocks of FIG. 4 may be performed by another device or a group of devices separate from or including the DevOps virtual assistant platform, such as a user device (e.g., user device 210), a backend platform (e.g., backend platform 220), and/or the like.

As shown in FIG. 4, process 400 may include analyzing, using a master bot, a DevOps workflow request received via a collaboration tool to identify one or more tasks that are to be performed to process the DevOps workflow request (block 410). For example, the DevOps virtual assistant platform (e.g., using computing resource 234, processor 320, memory 330, storage component 340, input component 350, output component 360, communication interface 370, and/or the like) may analyze, using a master bot, a DevOps workflow request received via a collaboration tool to identify one or more tasks that are to be performed to process the DevOps workflow request, as described above.

As further shown in FIG. 4, process 400 may include activating, using the master bot, one or more worker bots of the DevOps virtual assistant platform based on the one or more tasks (block 420). For example, the DevOps virtual assistant platform (e.g., using computing resource 234, processor 320, memory 330, storage component 340, input component 350, output component 360, communication interface 370, and/or the like) may activate, using the master bot, one or more worker bots of the DevOps virtual assistant platform based on the one or more tasks, as described above.

As further shown in FIG. 4, process 400 may include assigning, using the master bot, the one or more tasks to the one or more worker bots, wherein each task of the one or more tasks is assigned based on a worker bot type of each of the one or more worker bots (block 430). For example, the DevOps virtual assistant platform (e.g., using computing resource 234, processor 320, memory 330, storage component 340, input component 350, output component 360, communication interface 370, and/or the like) may assign, suing the master bot, the one or more tasks to the one or more worker bots, as described above. In some implementations, each task of the one or more tasks is assigned based on a worker bot type of each of the one or more worker bots.

As further shown in FIG. 4, process 400 may include verifying, using a worker bot of the one or more worker bots and based on user credentials of a user associated with the DevOps workflow, that the user is authorized to access one or more backend DevOps tools associated with a task, of the one or more tasks, assigned to the worker bot (block 440). For example, the DevOps virtual assistant platform (e.g., using computing resource 234, processor 320, memory 330, storage component 340, input component 350, output component 360, communication interface 370, and/or the like) may verify, using a worker bot of the one or more worker bots and based on user credentials of a user associated with the DevOps workflow, that the user is authorized to access one or more backend DevOps tools associated with a task, of the one or more tasks, assigned to the worker bot, as described above.

As further shown in FIG. 4, process 400 may include accessing, using the worker bot and via a DevOps orchestration engine of the DevOps virtual assistant platform, the one or more backend DevOps tools to automatically perform the task using the one or more backend DevOps tools (block 450). For example, the DevOps virtual assistant platform (e.g., using computing resource 234, processor 320, memory 330, storage component 340, input component 350, output component 360, communication interface 370, and/or the like) may access, using a worker bot and via a DevOps orchestration engine of the DevOps virtual assistant platform, the one or more backend DevOps tools to automatically perform the task using the one or more backend DevOps tools, as described above.

As further shown in FIG. 4, process 400 may include determining that the one or more worker bots have completed the one or more tasks (block 460). For example, the DevOps virtual assistant platform (e.g., using computing resource 234, processor 320, memory 330, storage component 340, input component 350, output component 360, communication interface 370, and/or the like) may determine that the one or more worker bots have completed the one or more tasks, as described above.

As further shown in FIG. 4, process 400 may include providing, based on determining that the one or more worker bots have completed the one or more tasks, an indication via the collaboration tool that the DevOps workflow request has been processed (block 470). For example, the DevOps virtual assistant platform (e.g., using computing resource 234, processor 320, memory 330, storage component 340, input component 350, output component 360, communication interface 370, and/or the like) may provide, based on determining that the one or more worker bots have completed the one or more tasks, an indication via the collaboration tool that the DevOps workflow request has been processed, as described above.

Process 400 may include additional implementations, such as any single implementation or any combination of implementations described below and/or in connection with one or more other processes described elsewhere herein.

In a first implementation, analyzing the DevOps workflow request comprises parsing, using natural language processing, the DevOps workflow request to identify one or more words or phrases included in the DevOps workflow request; identifying one or more intent classifications and one or more entities based on the one or more words or phrases, and identifying the one or more tasks based at least in part on the one or more intent classifications and the one or more entities. In a second implementation, alone or in combination with the first implementation, analyzing the DevOps workflow request comprises determining that additional information associated with the DevOps workflow request is needed to assign the one or more tasks to the one or more worker bots; providing a request for the additional information associated with the DevOps workflow request via the collaboration tool, and receiving, via the collaboration tool and based on providing the request, the additional information associated with the DevOps workflow request.

In a third implementation, alone or in combination with one or more of the first and second implementations, verifying that the user is authorized to access the one or more backend DevOps tools associated with the task assigned to the worker bot comprises verifying, via the DevOps orchestration engine, that the user is authorized to access the one or more backend DevOps tools associated with the task assigned to the worker bot. In a fourth implementation, alone or in combination with one or more of the first through third implementations, accessing the one or more backend DevOps tools comprises providing one or more REST API calls to the one or more backend DevOps tools.

In a fifth implementation, alone or in combination with one or more of the first through fourth implementations, process 400 includes generating, for display, a bot management and monitoring interface that includes at least one of a visual display of a respective status for each of the one or more worker bots, a visual display of historical availability of the worker bot, a visual display of a respective status for each of the task and other tasks is assigning to the worker bot, or a visual display of whether the task and the other tasks is being completed successfully. In a sixth implementation, alone or in combination with one or more of the first through fifth implementations, the worker bot type of each of the one or more worker bots comprises a CI/CD pipeline worker bot, a deployment worker bot, an environment worker bot, an incident tracking worker bot, an access management worker bot, an audit worker bot, or a wiki worker bot.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
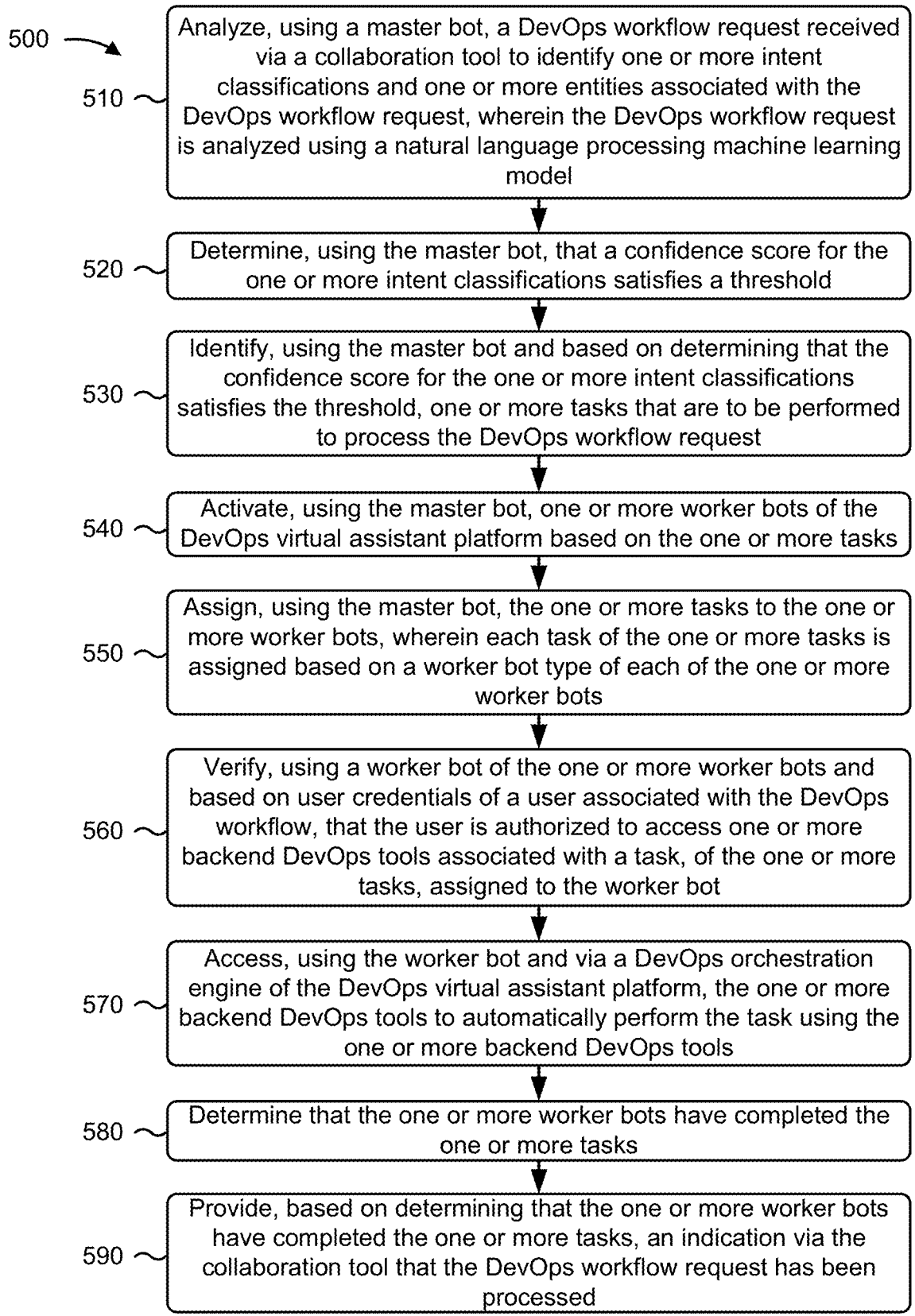

FIG. 5 is a flow chart of an example process 500 for processing a DevOps workflow request using a DevOps virtual assistant platform. In some implementations, one or more process blocks of FIG. 5 may be performed by a DevOps virtual assistant platform (e.g., DevOps virtual assistant platform 230, device 300, and/or the like). In some implementations, one or more process blocks of FIG. 5 may be performed by another device or a group of devices separate from or including the DevOps virtual assistant platform, such as a user device (e.g., user device 210), a backend platform (e.g., backend platform 220), and/or the like.

As shown in FIG. 5, process 500 may include analyzing, using a master bot, a DevOps workflow request received via a collaboration tool to identify one or more intent classifications and one or more entities associated with the DevOps workflow request, wherein the DevOps workflow request is analyzed using a natural language processing machine learning model (block 510). For example, the DevOps virtual assistant platform (e.g., using computing resource 234, processor 320, memory 330, storage component 340, input component 350, output component 360, communication interface 370, and/or the like) may analyze, using a master bot, a DevOps workflow request received via a collaboration tool to identify one or more intent classifications and one or more entities associated with the DevOps workflow request, as described above. In some implementations, the DevOps workflow request is analyzed using a natural language processing machine learning model.

As further shown in FIG. 5, process 500 may include determining, using the master bot, that a confidence score for the one or more intent classifications satisfies a threshold (block 520). For example, the DevOps virtual assistant platform (e.g., using computing resource 234, processor 320, memory 330, storage component 340, input component 350, output component 360, communication interface 370, and/or the like) may determine, using the master bot, that a confidence score for the one or more intent classifications satisfies a threshold, as described above.

As further shown in FIG. 5, process 500 may include identifying, using the master bot and based on determining that the confidence score for the one or more intent classifications satisfies the threshold, one or more tasks that are to be performed to process the DevOps workflow request (block 530). For example, the DevOps virtual assistant platform (e.g., using computing resource 234, processor 320, memory 330, storage component 340, input component 350, output component 360, communication interface 370, and/or the like) may identify, using the master bot and based on determining that the confidence score for the one or more intent classifications satisfies the threshold, one or more tasks that are to be performed to process the DevOps workflow request, as described above.

As further shown in FIG. 5, process 500 may include activating, using the master bot, one or more worker bots of the DevOps virtual assistant platform based on the one or more tasks (block 540). For example, the DevOps virtual assistant platform (e.g., using computing resource 234, processor 320, memory 330, storage component 340, input component 350, output component 360, communication interface 370, and/or the like) may activate, using the master bot, one or more worker bots of the DevOps virtual assistant platform based on the one or more tasks, as described above.

As further shown in FIG. 5, process 500 may include assigning, using the master bot, the one or more tasks to the one or more worker bots, wherein each task of the one or more tasks is assigned based on a worker bot type of each of the one or more worker bots (block 550). For example, the DevOps virtual assistant platform (e.g., using computing resource 234, processor 320, memory 330, storage component 340, input component 350, output component 360, communication interface 370, and/or the like) may assign, using the master bot, the one or more tasks to the one or more worker bots, as described above. In some implementations, each task of the one or more tasks is assigned based on a worker bot type of each of the one or more worker bots.

As further shown in FIG. 5, process 500 may include verifying, using a worker bot of the one or more worker bots and based on user credentials of a user associated with the DevOps workflow, that the user is authorized to access one or more backend DevOps tools associated with a task, of the one or more tasks, assigned to the worker bot (block 560). For example, the DevOps virtual assistant platform (e.g., using computing resource 234, processor 320, memory 330, storage component 340, input component 350, output component 360, communication interface 370, and/or the like) may verify, using a worker bot of the one or more worker bots and based on user credentials of a user associated with the DevOps workflow, that the user is authorized to access one or more backend DevOps tools associated with a task, of the one or more tasks, assigned to the worker bot, as described above.

As further shown in FIG. 5, process 500 may include accessing, using the worker bot and via a DevOps orchestration engine of the DevOps virtual assistant platform, the one or more backend DevOps tools to automatically perform the task using the one or more backend DevOps tools (block 570). For example, the DevOps virtual assistant platform (e.g., using computing resource 234, processor 320, memory 330, storage component 340, input component 350, output component 360, communication interface 370, and/or the like) may access, using the worker bot and via a DevOps orchestration engine of the DevOps virtual assistant platform, the one or more backend DevOps tools to automatically perform the task using the one or more backend DevOps tools, as described above.

As further shown in FIG. 5, process 500 may include determining that the one or more worker bots have completed the one or more tasks (block 580). For example, the DevOps virtual assistant platform (e.g., using computing resource 234, processor 320, memory 330, storage component 340, input component 350, output component 360, communication interface 370, and/or the like) may determine that the one or more worker bots have completed the one or more tasks, as described above.

As further shown in FIG. 5, process 500 may include providing, based on determining that the one or more worker bots have completed the one or more tasks, an indication via the collaboration tool that the DevOps workflow request has been processed (block 590). For example, the DevOps virtual assistant platform (e.g., using computing resource 234, processor 320, memory 330, storage component 340, input component 350, output component 360, communication interface 370, and/or the like) may provide, based on determining that the one or more worker bots have completed the one or more tasks, an indication via the collaboration tool that the DevOps workflow request has been processed, as described above.

Process 500 may include additional implementations, such as any single implementation or any combination of implementations described below and/or in connection with one or more other processes described elsewhere herein.

In a first implementation, each of the one or more worker bots is implemented as a containerized microservice. In a second implementation, alone or in combination with the first implementation, the one or more tasks include at least one of deploying an application in a non-production or production environment, configuring one or more deployment environment parameters for the application, performing incident monitoring for the application, providing process and workflow auditing and validation for the application, or deploying one or more virtual machines.

In a third implementation, alone or in combination with one or more of the first and second implementations, process 500 includes receiving the DevOps workflow request via dedicated DevOps virtual assistant chat window of the collaboration tool. In a fourth implementation, alone or in combination with one or more of the first through third implementations, process 500 includes automatically is performing, using the one or more worker bots, the one or more tasks in parallel.

In a fifth implementation, alone or in combination with one or more of the first through fourth implementations, the worker bot type of each of the one or more worker bots comprises a CI/CD pipeline worker bot, a deployment worker bot, an environment worker bot, an incident tracking worker bot, an access management worker bot, an audit worker bot, or a wiki worker bot. In a sixth implementation, alone or in combination with one or more of the first through fifth implementations, process 500 includes generating, for display, a bot management and monitoring interface that includes at least one of: a visual display of a respective status for each of the one or more worker bots, a visual display of historical availability of the worker bot, a visual display of a respective status for each of the task and other tasks is assigning to the worker bot, or a visual display of whether the task and the other tasks is being completed successfully.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
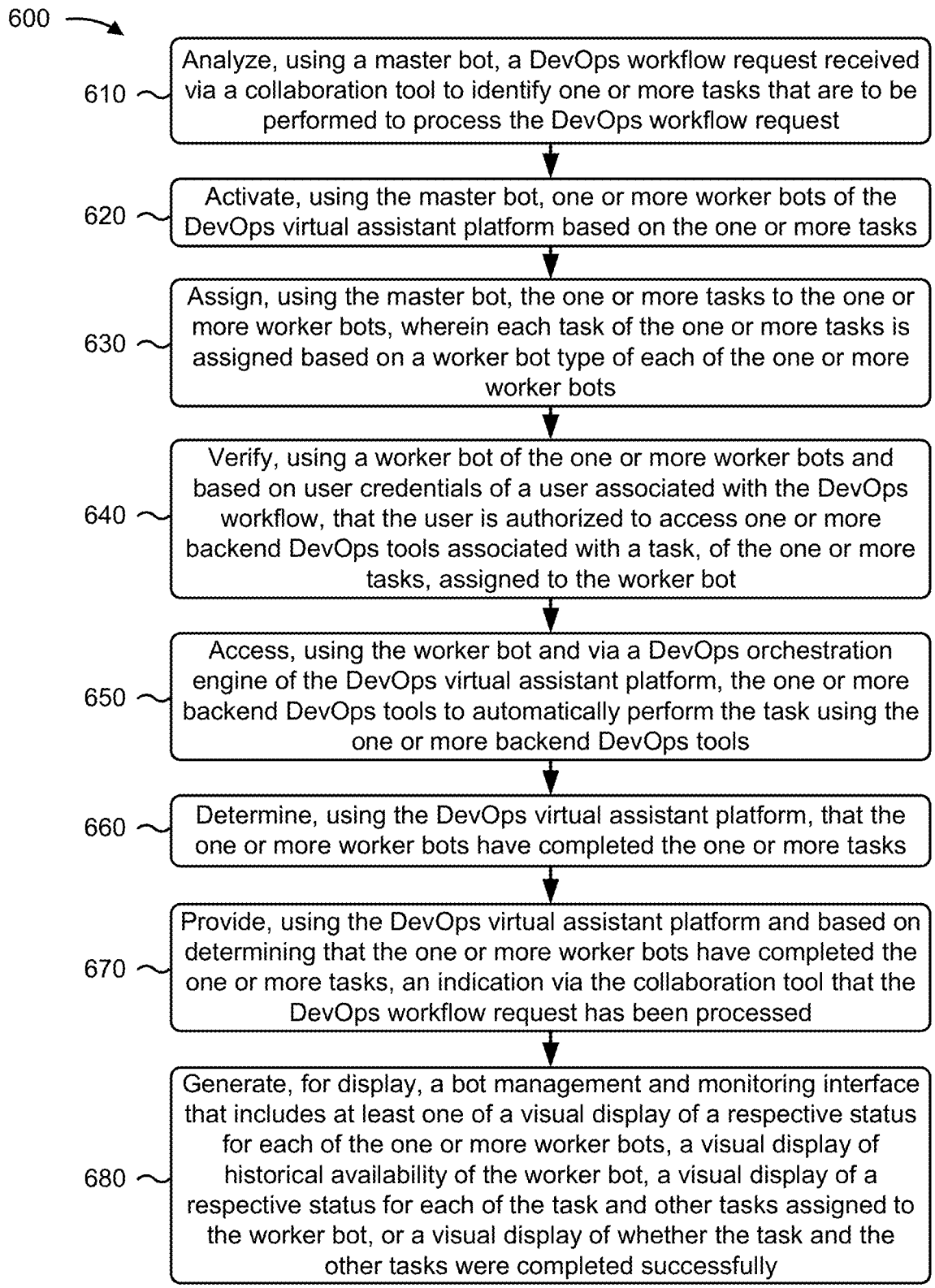

FIG. 6 is a flow chart of an example process 600 for processing a DevOps workflow request using a DevOps virtual assistant platform. In some implementations, one or more process blocks of FIG. 6 may be performed by a DevOps virtual assistant platform (e.g., DevOps virtual assistant platform 230, device 300, and/or the like). In some implementations, one or more process blocks of FIG. 6 may be performed by another device or a group of devices separate from or including the DevOps virtual assistant platform, such as a user device (e.g., user device 210), a backend platform (e.g., backend platform 220), and/or the like.

As shown in FIG. 6, process 600 may include analyzing, using a master bot, a DevOps workflow request received via a collaboration tool to identify one or more tasks that are to be performed to process the DevOps workflow request (block 610). For example, the DevOps virtual assistant platform (e.g., using computing resource 234, processor 320, memory 330, storage component 340, input component 350, output component 360, communication interface 370, and/or the like) may analyze, using a master bot, a DevOps workflow request received via a collaboration tool to identify one or more tasks that are to be performed to process the DevOps workflow request, as described above.

As further shown in FIG. 6, process 600 may include activating, using the master bot, one or more worker bots of the DevOps virtual assistant platform based on the one or more tasks (block 620). For example, the DevOps virtual assistant platform (e.g., using computing resource 234, processor 320, memory 330, storage component 340, input component 350, output component 360, communication interface 370, and/or the like) may activate, using the master bot, one or more worker bots of the DevOps virtual assistant platform based on the one or more tasks, as described above.

As further shown in FIG. 6, process 600 may include assigning, using the master bot, the one or more tasks to the one or more worker bots, wherein each task of the one or more tasks is assigned based on a worker bot type of each of the one or more worker bots (block 630). For example, the DevOps virtual assistant platform (e.g., using computing resource 234, processor 320, memory 330, storage component 340, input component 350, output component 360, communication interface 370, and/or the like) may assign, using the master bot, the one or more tasks to the one or more worker bots, as described above. In some implementations, each task of the one or more tasks is assigned based on a worker bot type of each of the one or more worker bots.

As further shown in FIG. 6, process 600 may include verifying, using a worker bot of the one or more worker bots and based on user credentials of a user associated with the DevOps workflow, that the user is authorized to access one or more backend DevOps tools associated with a task, of the one or more tasks, assigned to the worker bot (block 640). For example, the DevOps virtual assistant platform (e.g., using computing resource 234, processor 320, memory 330, storage component 340, input component 350, output component 360, communication interface 370, and/or the like) may verify, using a worker bot of the one or more worker bots and based on user credentials of a user associated with the DevOps workflow, that the user is authorized to access one or more backend DevOps tools associated with a task, of the one or more tasks, assigned to the worker bot, as described above.

As further shown in FIG. 6, process 600 may include accessing, using the worker bot and via a DevOps orchestration engine of the DevOps virtual assistant platform, the one or more backend DevOps tools to automatically perform the task using the one or more backend DevOps tools (block 650). For example, the DevOps virtual assistant platform (e.g., using computing resource 234, processor 320, memory 330, storage component 340, input component 350, output component 360, communication interface 370, and/or the like) may access, using the worker bot and via a DevOps orchestration engine of the DevOps virtual assistant platform, the one or more backend DevOps tools to automatically perform the task using the one or more backend DevOps tools, as described above.

As further shown in FIG. 6, process 600 may include determining, using the DevOps virtual assistant platform, that the one or more worker bots have completed the one or more tasks (block 660). For example, the DevOps virtual assistant platform (e.g., using computing resource 234, processor 320, memory 330, storage component 340, input component 350, output component 360, communication interface 370, and/or the like) may determine, using the DevOps virtual assistant platform, that the one or more worker bots have completed the one or more tasks, as described above.

As further shown in FIG. 6, process 600 may include providing, using the DevOps virtual assistant platform and based on determining that the one or more worker bots have completed the one or more tasks, an indication via the collaboration tool that the DevOps workflow request has been processed (block 670). For example, the DevOps virtual assistant platform (e.g., using computing resource 234, processor 320, memory 330, storage component 340, input component 350, output component 360, communication interface 370, and/or the like) may provide, using the DevOps virtual assistant platform and based on determining that the one or more worker bots have completed the one or more tasks, an indication via the collaboration tool that the DevOps workflow request has been processed, as described above.

As further shown in FIG. 6, process 600 may include generating, for display, a bot management and monitoring interface that includes at least one of: a visual display of a respective status for each of the one or more worker bots, a visual display of historical availability of the worker bot, a visual display of a respective status for each of the task and other tasks assigned to the worker bot, or a visual display of whether the task and the other tasks were completed successfully (block 680). For example, the DevOps virtual assistant platform (e.g., using computing resource 234, processor 320, memory 330, storage component 340, input component 350, output component 360, communication interface 370, and/or the like) may generate, for display, a bot management and monitoring interface that includes at least one of, as described above.

Process 600 may include additional implementations, such as any single implementation or any combination of implementations described below and/or in connection with one or more other processes described elsewhere herein.

In a first implementation, process 600 includes receiving the DevOps workflow request via a chat window, of the collaboration tool, between a user and another user, wherein the DevOps virtual assistant platform is being identified in the DevOps workflow request. In a second implementation, alone or in combination with the first implementation, analyzing the DevOps workflow request comprises determining that additional information associated with the DevOps workflow request is needed to assign the one or more tasks to the one or more worker bots; providing a request for the additional information associated with the DevOps workflow request via the collaboration tool; and receiving, via the collaboration tool and based on providing the request, the additional information associated with the DevOps workflow request.

In a third implementation, alone or in combination with one or more of the first and second implementations, accessing the one or more backend DevOps tools comprises providing, using the DevOps orchestration engine, one or more REST API calls to the one or more backend DevOps tools. In a fourth implementation, alone or in combination with one or more of the first through third implementations, each of the one or more worker bots is implemented as a containerized microservice. In a fifth implementation, alone or in combination with one or more of the first through fourth implementations, verifying that the user is authorized to access the one or more backend DevOps tools associated with the task assigned to the worker bot comprises verifying, via the DevOps orchestration engine, that the user is authorized to access the one or more backend DevOps tools associated with the task assigned to the worker bot.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    analyzing, by a master bot of development operations (DevOps) virtual assistant platform, a DevOps workflow request received via a collaboration tool to identify one or more tasks that are to be performed to process the DevOps workflow request;
    activating, by the master bot, one or more worker bots of the DevOps virtual assistant platform based on the one or more tasks;
    assigning, by the master bot, the one or more tasks to the one or more worker bots,
        wherein each task of the one or more tasks is assigned based on a worker bot type of each of the one or more worker bots;
    verifying, by a worker bot of the one or more worker bots and based on user credentials of a user associated with the DevOps workflow, that the user is authorized to access one or more backend DevOps tools associated with a task, of the one or more tasks, assigned to the worker bot;
    accessing, by the worker bot and via a DevOps orchestration engine of the DevOps virtual assistant platform, the one or more backend DevOps tools to automatically perform the task using the one or more backend DevOps tools;
    determining, by the DevOps virtual assistant platform, that the one or more worker bots have completed the one or more tasks; and
    providing, by the DevOps virtual assistant platform and based on determining that the one or more worker bots have completed the one or more tasks, an indication via the collaboration tool that the DevOps workflow request has been processed.

2. The method of claim 1, wherein analyzing the DevOps workflow request comprises:
    parsing, using natural language processing, the DevOps workflow request to identify one or more words or phrases included in the DevOps workflow request;
    identifying one or more intent classifications and one or more entities based on the one or more words or phrases; and
    identifying the one or more tasks based at least in part on the one or more intent classifications and the one or more entities.

3. The method of claim 1, wherein analyzing the DevOps workflow request comprises:
    determining that additional information associated with the DevOps workflow request is needed to assign the one or more tasks to the one or more worker bots;

providing a request for the additional information associated with the DevOps workflow request via the collaboration tool; and receiving, via the collaboration tool and based on providing the request, the additional information associated with the DevOps workflow request.

4. The method of claim 1, wherein verifying that the user is authorized to access the one or more backend DevOps tools associated with the task assigned to the worker bot comprises:
verifying, via the DevOps orchestration engine, that the user is authorized to access the one or more backend DevOps tools associated with the task assigned to the worker bot.

5. The method of claim 1, wherein accessing the one or more backend DevOps tools comprises:
providing, by the DevOps orchestration engine, one or more representational state transfer (REST) application programing interface (API) calls to the one or more backend DevOps tools.

6. The method of claim 1, further comprising:
generating, for display, a bot management and monitoring interface that includes at least one of:
a visual display of a respective status for each of the one or more worker bots,
a visual display of historical availability of the worker bot,
a visual display of a respective status for each of the task and other tasks assigned to the worker bot, or
a visual display of whether the task and the other tasks were completed successfully.

7. The method of claim 1, wherein the worker bot type of each of the one or more worker bots comprises:
a continuous integration continuous deployment (CI/CD) pipeline worker bot,
a deployment worker bot,
an environment worker bot,
an incident tracking worker bot,
an access management worker bot,
an audit worker bot, or
a wiki worker bot.

8. A development operations (DevOps) virtual assistant platform, comprising:
one or more memories; and
one or more processors, communicatively coupled to the one or more memories, to:
analyze, using a master bot, a DevOps workflow request received via a collaboration tool to identify one or more intent classifications and one or more entities associated with the DevOps workflow request,
wherein the DevOps workflow request is analyzed using a natural language processing machine learning model;
determine, using the master bot, that a confidence score for the one or more intent classifications satisfies a threshold;
identify, using the master bot and based on determining that the confidence score for the one or more intent classifications satisfies the threshold, one or more tasks that are to be performed to process the DevOps workflow request;
activate, using the master bot, one or more worker bots of the DevOps virtual assistant platform based on the one or more tasks;
assign, using the master bot, the one or more tasks to the one or more worker bots,
wherein each task of the one or more tasks is assigned based on a worker bot type of each of the one or more worker bots;
verify, using a worker bot of the one or more worker bots and based on user credentials of a user associated with the DevOps workflow, that the user is authorized to access one or more backend DevOps tools associated with a task, of the one or more tasks, assigned to the worker bot;
access, using the worker bot and via a DevOps orchestration engine of the DevOps virtual assistant platform, the one or more backend DevOps tools to automatically perform the task using the one or more backend DevOps tools;
determine that the one or more worker bots have completed the one or more tasks; and
provide, based on determining that the one or more worker bots have completed the one or more tasks, an indication via the collaboration tool that the DevOps workflow request has been processed.

9. The DevOps virtual assistant platform of claim 8, wherein each of the one or more worker bots is implemented as a containerized microservice.

10. The DevOps virtual assistant platform of claim 8, wherein the one or more tasks include at least one of:
deploying an application in a non-production or production environment,
configuring one or more deployment environment parameters for the application,
performing incident monitoring for the application,
providing process and workflow auditing and validation for the application, or
deploying one or more virtual machines.

11. The DevOps virtual assistant platform of claim 8, wherein the one or more processors are further configured to:
receive the DevOps workflow request via dedicated DevOps virtual assistant chat window of the collaboration tool.

12. The DevOps virtual assistant platform of claim 8, wherein the one or more processors are further configured to:
automatically perform, using the one or more worker bots, the one or more tasks in parallel.

13. The DevOps virtual assistant platform of claim 8, wherein the worker bot type of each of the one or more worker bots comprises:
a continuous integration continuous deployment (CI/CD) pipeline worker bot,
a deployment worker bot,
an environment worker bot,
an incident tracking worker bot,
an access management worker bot,
an audit worker bot, or
a wiki worker bot.

14. The DevOps virtual assistant platform of claim 8, wherein the one or more processors are further configured to:
generate, for display, a bot management and monitoring interface that includes at least one of:
a visual display of a respective status for each of the one or more worker bots,
a visual display of historical availability of the worker bot,
a visual display of a respective status for each of the task and other tasks assigned to the worker bot, or a visual display of whether the task and the other tasks were completed successfully.

15. A non-transitory computer-readable medium storing instructions, the instructions comprising:
one or more instructions that, when executed by one or more processors of a development operations (DevOps) virtual assistant platform, cause the one or more processors to:
analyze, using a master bot, a DevOps workflow request received via a collaboration tool to identify one or more tasks that are to be performed to process the DevOps workflow request;
activate, using the master bot, one or more worker bots of the DevOps virtual assistant platform based on the one or more tasks;
assign, using the master bot, the one or more tasks to the one or more worker bots,
wherein each task of the one or more tasks is assigned based on a worker bot type of each of the one or more worker bots;
verify, using a worker bot of the one or more worker bots and based on user credentials of a user associated with the DevOps workflow, that the user is authorized to access one or more backend DevOps tools associated with a task, of the one or more tasks, assigned to the worker bot;
access, using the worker bot and via a DevOps orchestration engine of the DevOps virtual assistant platform, the one or more backend DevOps tools to automatically perform the task using the one or more backend DevOps tools;
determine, using the DevOps virtual assistant platform, that the one or more worker bots have completed the one or more tasks;
provide, using the DevOps virtual assistant platform and based on determining that the one or more worker bots have completed the one or more tasks, an indication via the collaboration tool that the DevOps workflow request has been processed; and
generate, for display, a bot management and monitoring interface that includes at least one of:
a visual display of a respective status for each of the one or more worker bots,
a visual display of historical availability of the worker bot,
a visual display of a respective status for each of the task and other tasks assigned to the worker bot, or
a visual display of whether the task and the other tasks were completed successfully.

16. The non-transitory computer-readable medium of claim 15, wherein the one or more instructions, when executed by the one or more processors, further cause the one or more processors to:
receive the DevOps workflow request via a chat window, of the collaboration tool, between a user and another user,
wherein the DevOps virtual assistant platform is identified in the DevOps workflow request.

17. The non-transitory computer-readable medium of claim 15, wherein the one or more instructions, that cause the one or more processors to analyze the DevOps workflow request, cause the one or more processors to:
determine that additional information associated with the DevOps workflow request is needed to assign the one or more tasks to the one or more worker bots;
provide a request for the additional information associated with the DevOps workflow request via the collaboration tool; and
receive, via the collaboration tool and based on providing the request, the additional information associated with the DevOps workflow request.

18. The non-transitory computer-readable medium of claim 15, wherein the one or more instructions, that cause the one or more processors to access the one or more backend DevOps tools, cause the one or more processors to:
provide, using the DevOps orchestration engine, one or more representational state transfer (REST) application programing interface (API) calls to the one or more backend DevOps tools.

19. The non-transitory computer-readable medium of claim 15, wherein each of the one or more worker bots is implemented as a containerized microservice.

20. The non-transitory computer-readable medium of claim 15, wherein the one or more instructions, that cause the one or more processors to verify that the user is authorized to access the one or more backend DevOps tools associated with the task assigned to the worker bot, cause the one or more processors to:
verify, via the DevOps orchestration engine, that the user is authorized to access the one or more backend DevOps tools associated with the task assigned to the worker bot.

* * * * *